Figure 1:
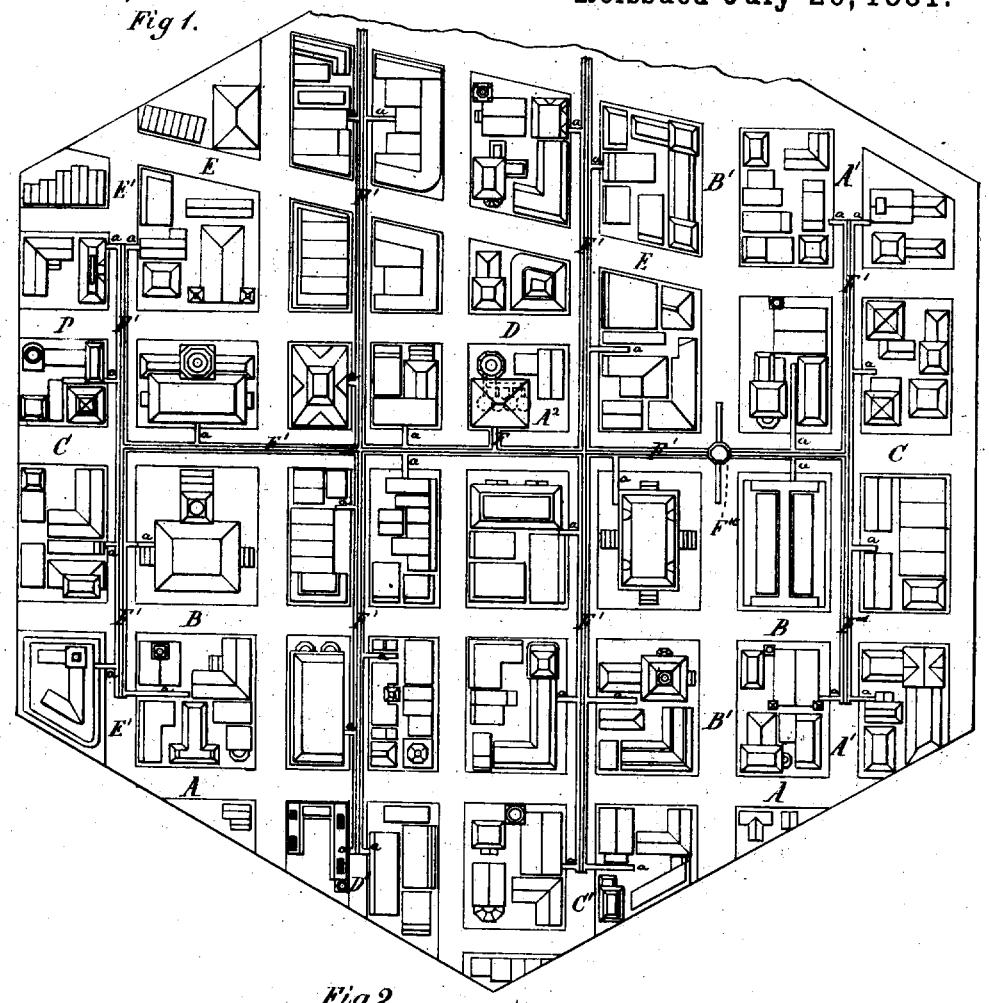

B. HOLLY.

APPARATUS FOR SUPPLYING DISTRICTS IN CITIES AND TOWNS WITH HEAT AND POWER.

No. 9,821. Reissued July 26, 1881.

*Witnesses:*

J. P. Theodore Lang.

J. F. Munson

*Inventor:*

Birdsill Holly by his Attys

Munn & Fenwick & Hamm

12 Sheets—Sheet 2.

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lang.
J. F. Munson

*Inventor:*
Birdsill Holly
by his attys
Munn & Berwick Hanner

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lang.
J. F. Munson

*Inventor:*
Birdsill Holly
by his attys
Mason Fenwick & Lawrence

B. HOLLY.

APPARATUS FOR SUPPLYING DISTRICTS IN CITIES AND TOWNS WITH HEAT AND POWER.

No. 9,821. Reissued July 26, 1881.

Witnesses:
J. P. Theodore Lang
J. F. Munson

Inventor:
Birdsill Holly
by his Attys
Munn Fenwick & Lemmer

B. HOLLY.

APPARATUS FOR SUPPLYING DISTRICTS IN CITIES AND TOWNS WITH HEAT AND POWER.

No. 9,821. Reissued July 26, 1881.

Witnesses:
J. P. Theodore Lang.
J. F. Thomson

Inventor:
Birdsill Holly
by his atty
Mason Fenwick & Lawrence

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lang.
T. F. Munson

*Inventor:*
Birdsill Holly
by his attys
Munn & Comstock & Sawyer

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lang
T. F. Munson

*Inventor:*
Birdsill Holly
by his attys
Masson Fennick & Hawnce

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lang
J. F. Munson

*Inventor:*
Birdsill Holly
by his Attys
Masson Fenwick & Lawrence

B. HOLLY.

APPARATUS FOR SUPPLYING DISTRICTS IN CITIES AND TOWNS WITH HEAT AND POWER.

No. 9,821. Reissued July 26, 1881.

Witnesses:
J. P. Theodore Lang.
S. F. Munson

Inventor:
Hiscock Holly
by his Attys
Mason Fenwick & Lawrence

B. HOLLY.

APPARATUS FOR SUPPLYING DISTRICTS IN CITIES AND TOWNS WITH HEAT AND POWER.

No. 9,821. Reissued July 26, 1881.

Witnesses:
J. P. Theodore Lang.
J. F. Munson

Inventor:
Burdett Holly
by his Attys
Munn Kenrick & Lawrence

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lang
T. F. Munson

*Inventor:*
Birdsill Holly
by his atty
Manuel Kenrick Hanner

B. HOLLY.

APPARATUS FOR SUPPLYING DISTRICTS IN CITIES AND TOWNS WITH HEAT AND POWER.

No. 9,821. Reissued July 26, 1881.

*Witnesses:*
J. P. Theodore Lung.
J. F. Munson

*Inventor:*
Birdsill Holly
by his attys
Mason Fenwick & Lawrence

BEST AVAILABLE COPY

UNITED STATES PATENT OFFICE.

BIRDSILL HOLLY, OF LOCKPORT, NEW YORK.

APPARATUS FOR SUPPLYING DISTRICTS IN CITIES AND TOWNS WITH HEAT AND POWER.

SPECIFICATION forming part of Reissued Letters Patent No. 9,821, dated July 26, 1881.

Original No. 193,086, dated July 17, 1877. Application for reissue filed May 24, 1881.

*To all whom it may concern:*

Be it known that I, BIRDSILL HOLLY, of Lockport, in the county of Niagara and State of New York, and a citizen of the United States, have invented a new and improved apparatus for supplying large districts of dwellings and other buildings in cities and towns with heat for warming purposes and with power for driving machinery and other purposes, of which the following is a specification.

My invention comprises, among many others, a new and useful mode of supplying large districts of dwellings and other buildings in cities, towns, and villages with heat for warming and other purposes, and also with power for driving machinery in such districts of dwellings or buildings; also, means whereby the fire-engines of a city, town, or village may at all times be supplied with power for raising water for the extinguishment of fires or large conflagrations, notwithstanding that such engines are constructed without means for "getting up" power or steam; also, means whereby the hydrants of a city, town, or village may at all times be economically and effectually protected against freezing; also, a cheap and ready means for freeing the streets of cities, towns, and villages from accumulated masses of snow and ice; also, a means whereby greenhouses, conservatories, and other outhouses may be heated; and, finally, a means whereby steam or hot water, or both steam and hot water, may be supplied for culinary and other domestic purposes.

In carrying out an invention like that hereinafter described several leading things are essential, of which a few will now be mentioned as being the most important, to wit: The street-main pipes must be laid underground in a manner similar to the water and gas pipes of a city, town, or village, and these mains ought to comprise manifold lines of pipes from which to supply heat and power to buildings on different squares along the streets of a district of buildings in a town or city. All of these mains should be adapted for having service-pipes attached to them on opposite sides of the respective streets; and the said mains should be capable of sustaining a great pressure, and their sections must be connected by joints which are loose, and which will permit of the main pipes expanding and contracting longitudinally, the expansion and contraction of one section, or of a series of sections, being independent of the other connected sections, and this without liability of breakage or leakage of the joints and mains; and the mains should also be adapted by proper insulation for preventing a too great loss of heat between the points of supply and consumption of the agent employed for producing heat and furnishing power. The mains should receive their supply of the heating and power agent from one or more central or principal points of the city, town, or village. Provision should be made for underground drainage and conducting off surplus water at the localities where the mains are applied, so as to avoid flooding and other injury to the mains; and a means for reducing the pressure of the steam supplied by the mains from a high to a very low pressure before it enters the radiators or other heating apparatus of a building or dwelling should be provided. There should be meters for measuring the quantity of steam used, regulators for keeping the pressure at any desired height, and recording or registering mechanisms, all of which, and many other things essential in a system of this kind, will be found in my apparatus or contrivance, as will be seen from the following description and accompanying drawings. With my underground mains and service-pipes, either steam, hot water, or heated air can be conveyed for warming and other purposes.

Figure 2:
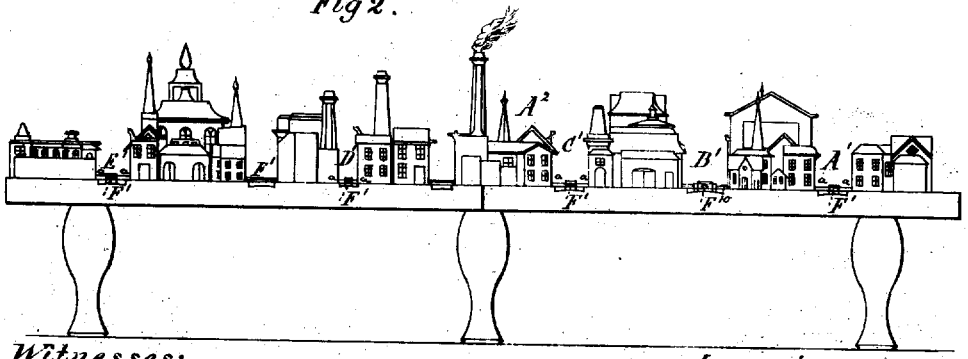
Figure 3:
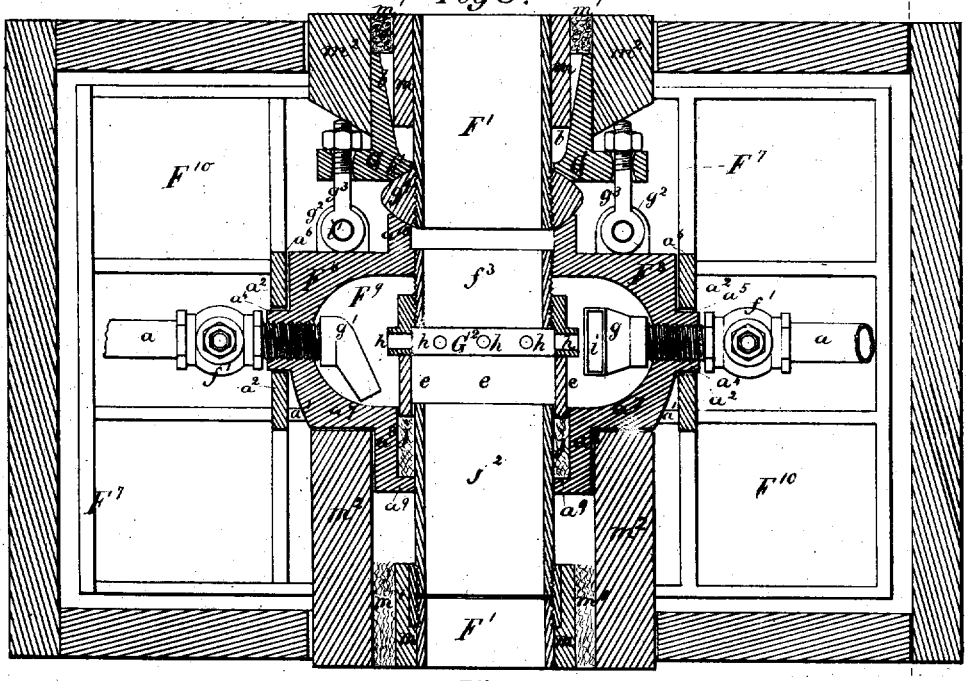
Figure 4:
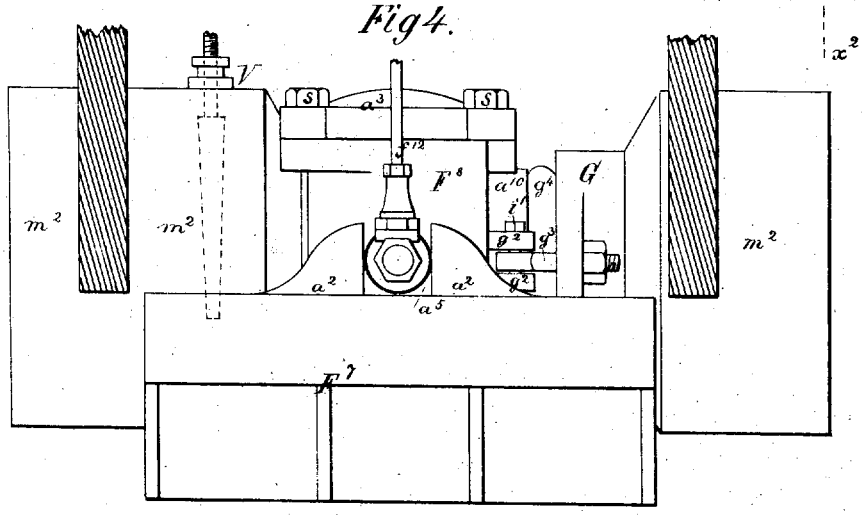
Figure 6:
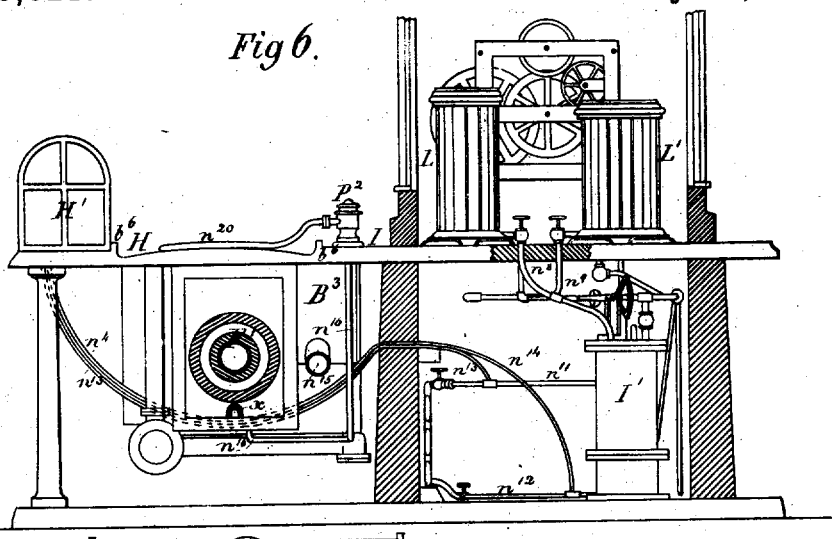
Figure 5:
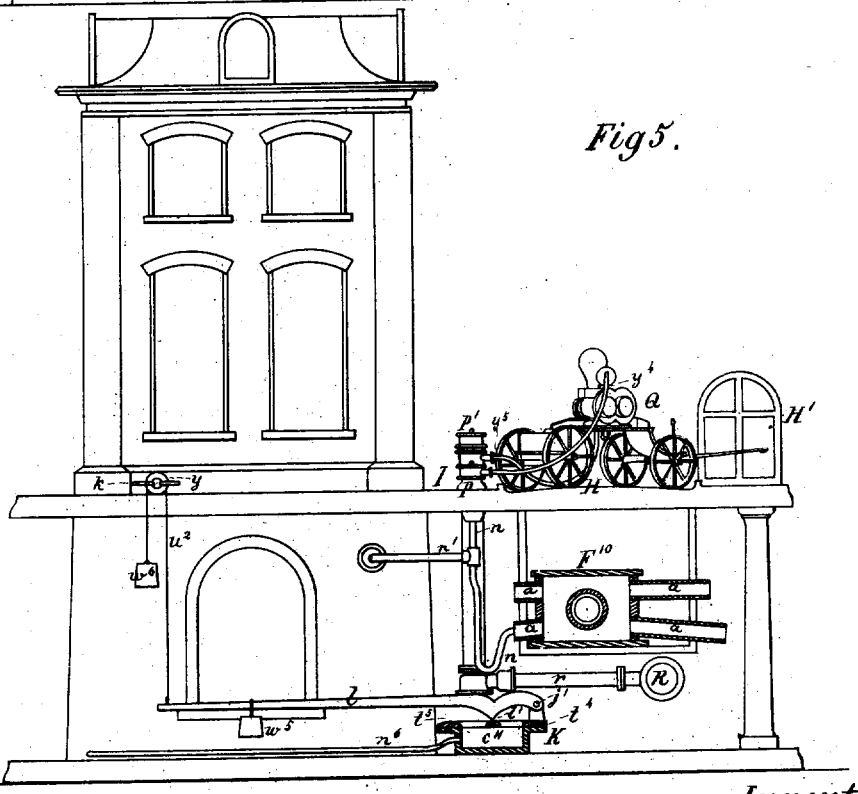
Figure 7:
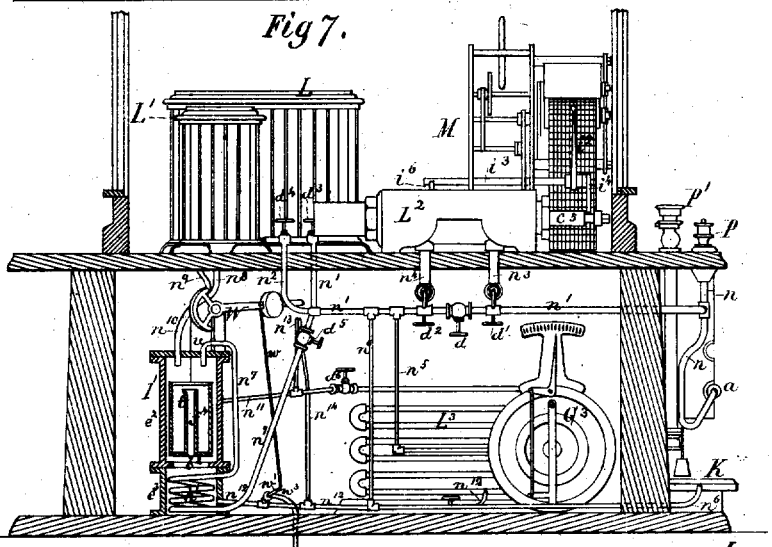

In the accompanying drawings, Figure 1 illustrates a plan view of my invention applied for heating a district of buildings in a city or town, and the transmitting steam for use for power in such districts. Fig. 2 is an elevation of the same. Fig. 3 is a horizontal section of one of the junction service-boxes of the street-mains and the connections thereof, and Fig. 4 is a vertical longitudinal section of the same in the line $x^2$ of Fig. 3. Fig. 5 is a vertical transverse section through a junction service-box of the mains and through a steam-regulator, and also an elevation of parts connected therewith, and of a building to be warmed and a fire-engine to be supplied with steam from underground street-mains. Fig. 6 is a transverse section and partial elevation through the building shown in Figs. 5 and 8. Fig. 7 is a vertical longitudinal section through the same

Figure 8:
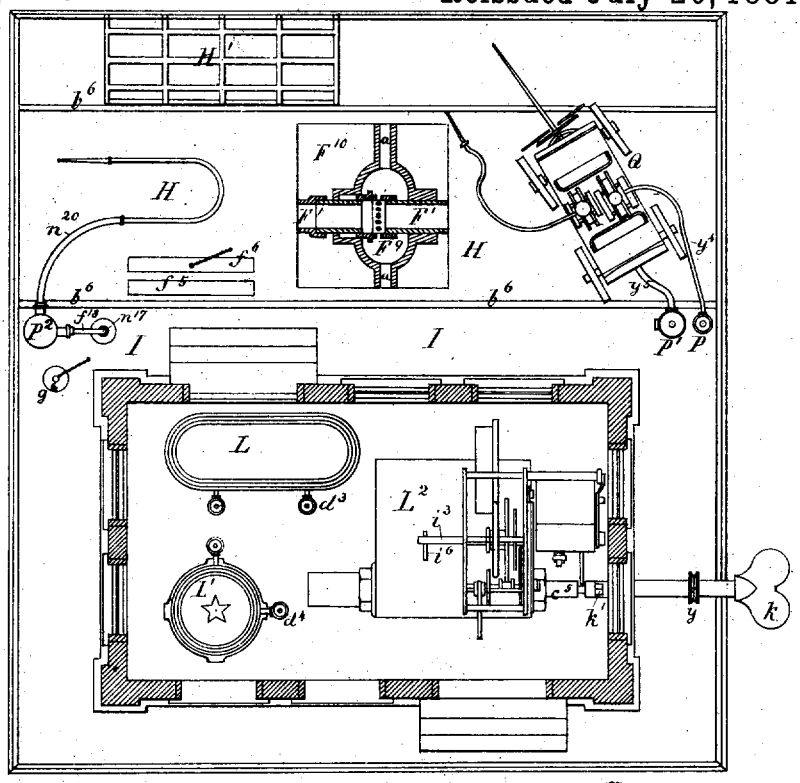
Figure 10:
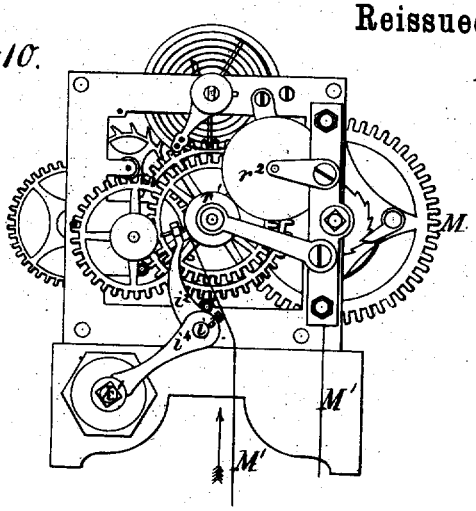
Figure 11:
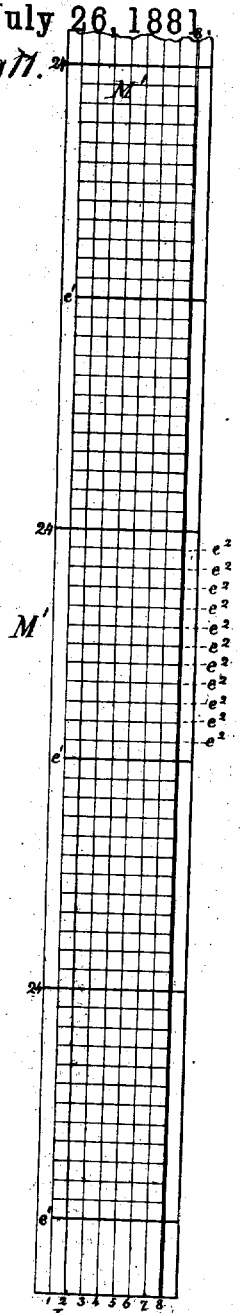
Figure 9:
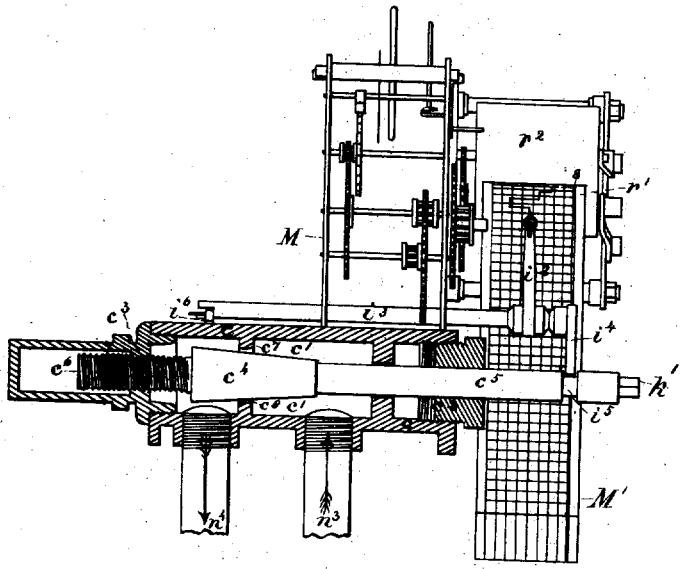
Figure 14:
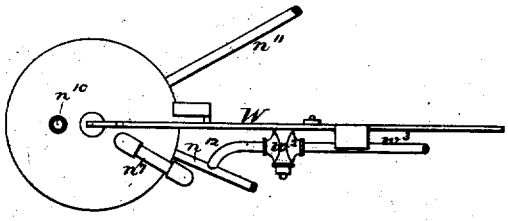
Figure 12:
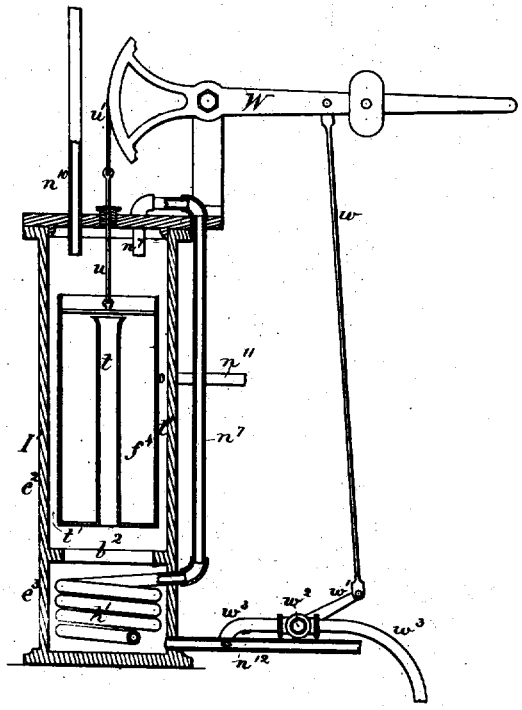
Figure 13:
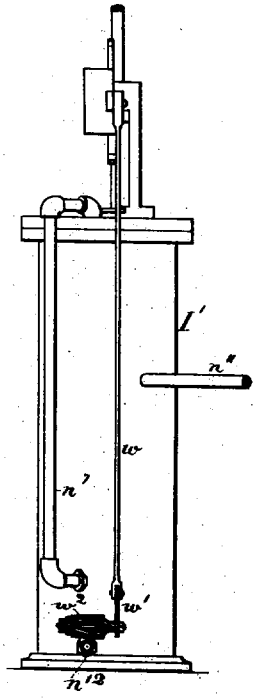
Figures 15, 16:
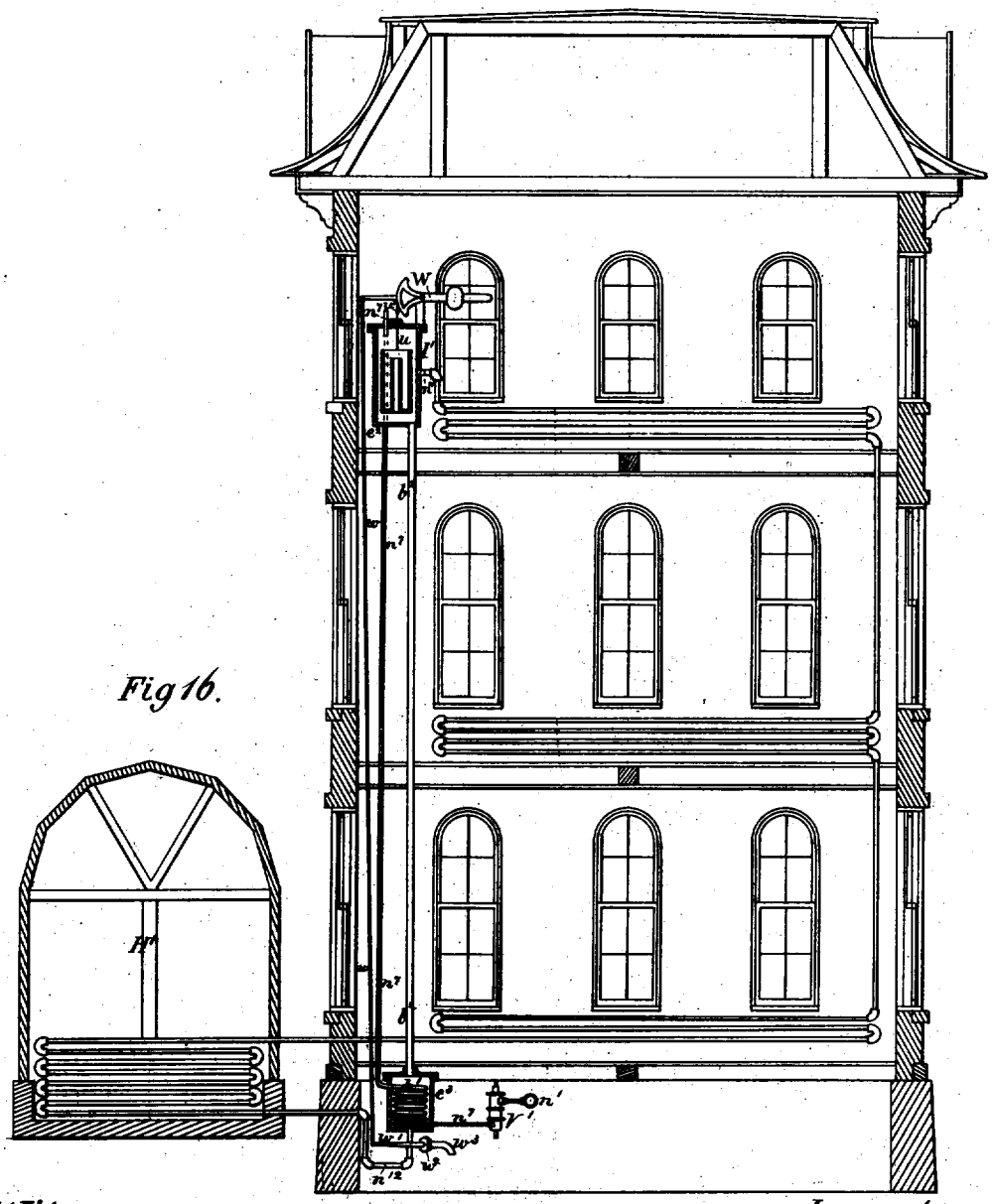
Figure 18:
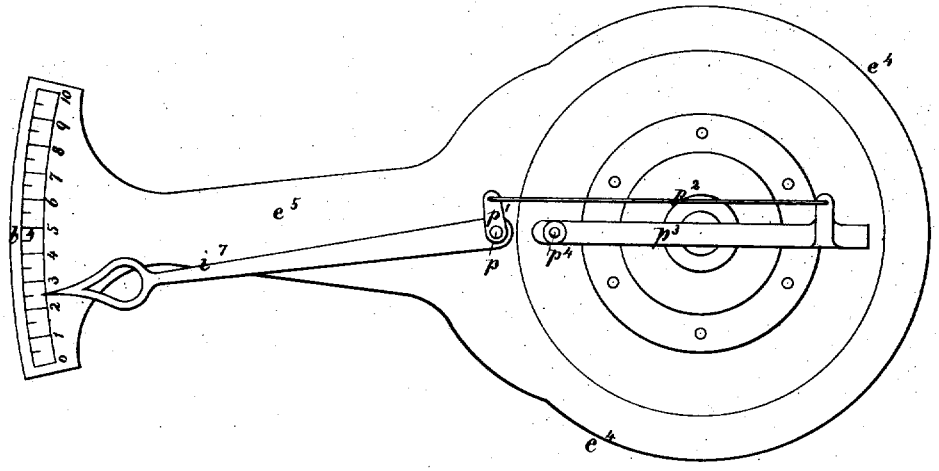
Figure 17:
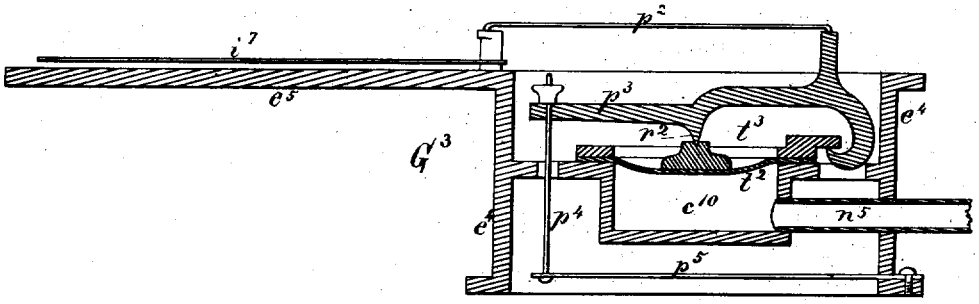
Figure 24:
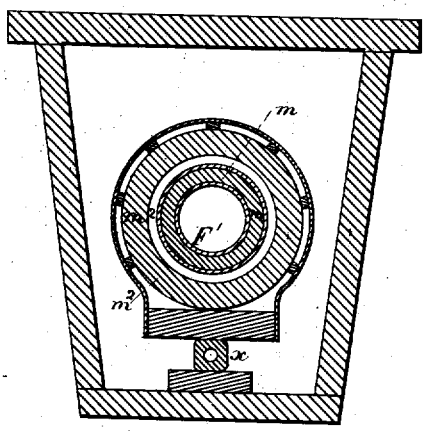
Figure 25:
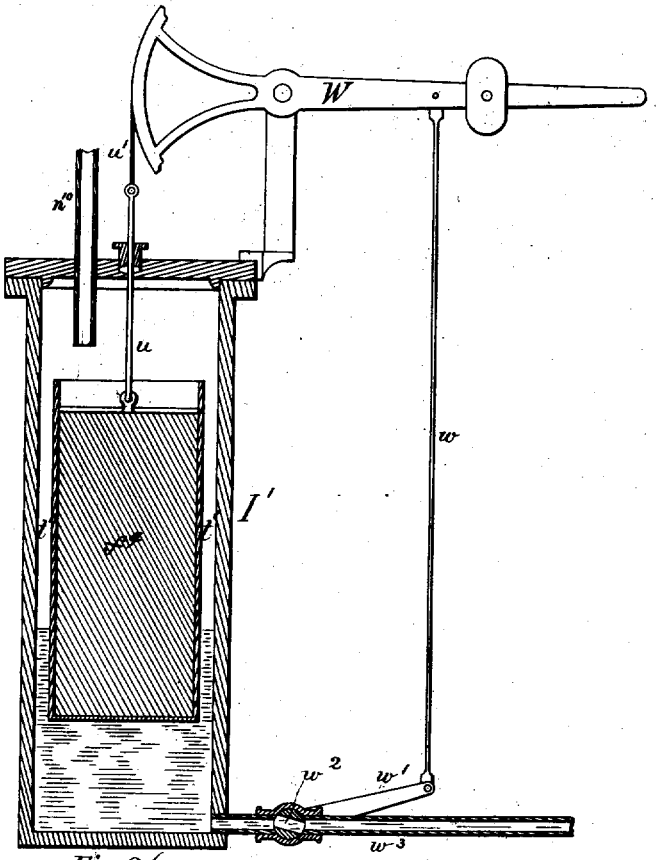
Figure 26:
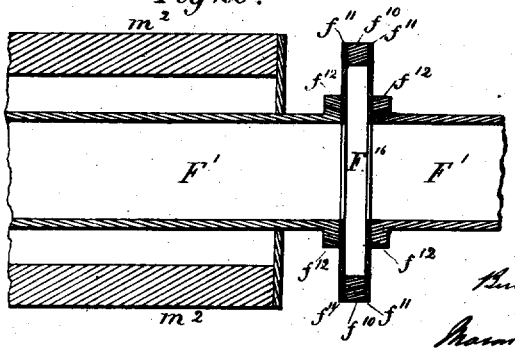
Figure 27:
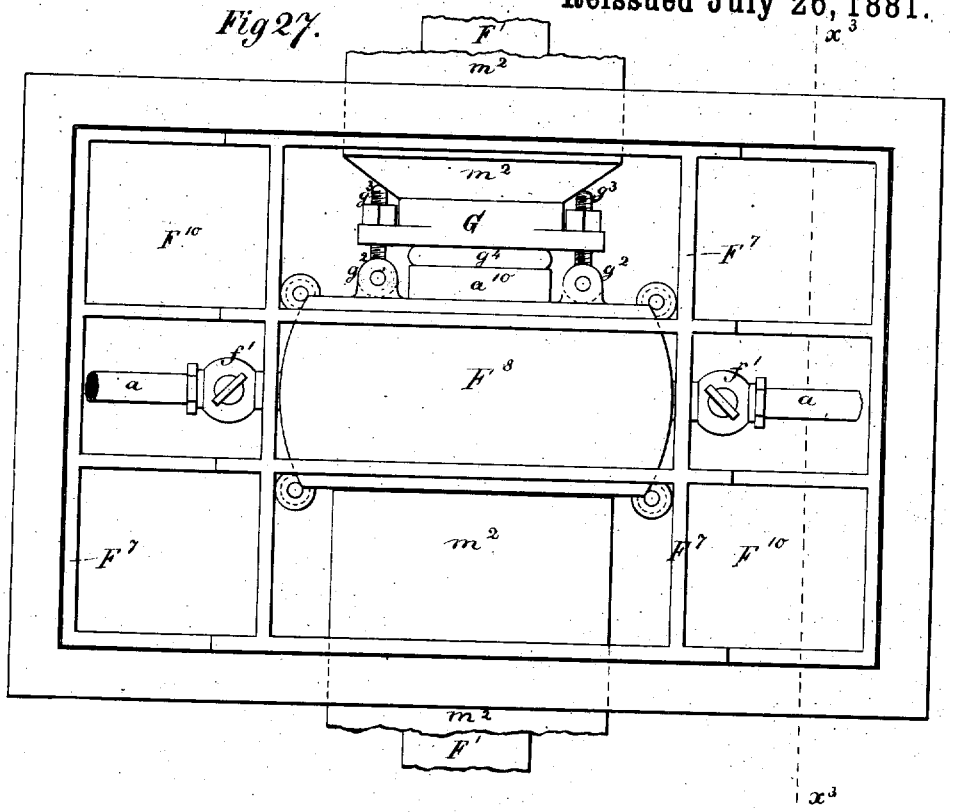
Figure 28:
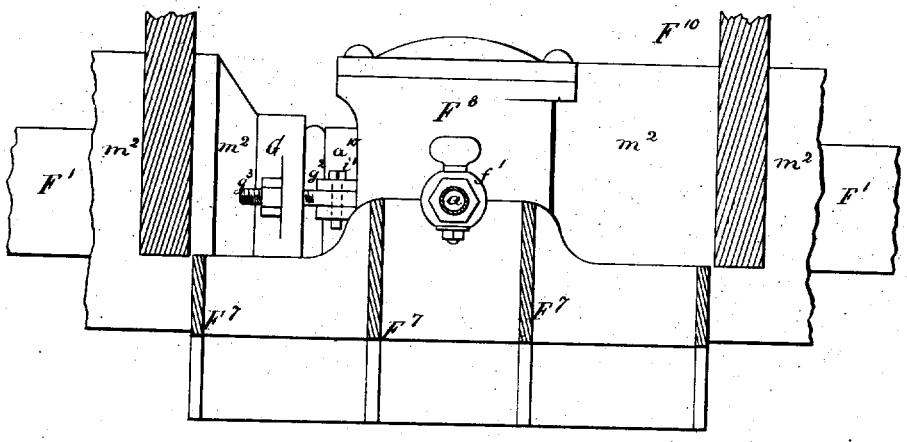

BEST AVAILABLE COPY building, near the front walls thereof. Fig. 8 is a horizontal section of a junction service-box of the mains, and of the building shown in Fig. 5, and a plan view of the parts which are above the basement story, as well as those which are on a level with the street. Fig. 9 is a partial longitudinal section and elevation of a steam-meter with its metal frame $L^2$ shown in Figs. 7 and 8 removed, and also an elevation of a registering or recording mechanism. Fig. 10 is an end elevation of the same. Fig. 11 is a plan view of the record-ribbon of the registering or recording mechanism. Fig. 12 is a vertical section of the steam-trap shown in Fig. 7, in connection with the radiators of the building. Fig. 13 shows an elevation of the trap and a section through its waste-cock. Fig. 14 is a top view of the trap, with a section through the pipe which leads water of condensation into the trap. Figs. 15 and 16 show a modification of the trap and its manner of application to the building and a greenhouse. Figs. 17 and 18 are a section and a front elevation of a steam-gage used for indicating the pressure of steam in the radiators. Figs. 19, 20, 21, 22, and 23 are views in which a connection of the service-pipes with the mains is shown, as well as the casing of the service-pipes. Fig. 24 is a vertical transverse section of one of the steam-mains, and showing protecting and heat-insulating covering and drain pipe or tile beneath, also in section. Fig. 25 is a section of an ordinary steam-trap which is substituted in some cases for the traps shown in Figs. 12, 13, 14, and 17. Fig. 26 is a section of a portion of Fig. 19. Fig. 27 is an inverted plan view of the junction service-boxes, and Fig. 28 is a longitudinal section of the junction service-box in the line $x^3$ $x^3$ of Fig. 27.

In the plan view of Fig. 1 of the drawings a section or district of a city or town having streets, as at A, B, C, D, and E, and at A′, B′, C′, D′, and E′, intersecting each other is shown. From a central or nearly central point of such section or district of a city or town to any given point of its boundary there may be a distance, say, of about one-half of a mile. At this central point, and within a building designated as at $A^2$, are erected the necessary boiler-works for the generating of steam to be distributed throughout said district for the purposes contemplated in carrying out my invention. The steam in the building $A^2$ is conveyed by a proper pipe or pipes from the boilers therein to a short street-main pipe, F, which connects with and supplies steam to all the other main pipes, F′, within the said district. All the steam-main pipes are laid underground on the line of the several streets of the city or town included in such district, and about four feet below the surface of the ground; and service-pipes, as at *a*, also laid underground, convey steam from the said mains into buildings or dwellings situated on different sides of the street, as indicated in the drawings.

The mains run underground through the various streets of a city, town, or village in a manner similar to the water or gas supplying mains of a city or town, but differing therefrom in that they are constructed with loose joints, which permit the mains to expand and contract longitudinally without injury to them and without leakage, and also are insulated to prevent condensation of steam and loss of heat. All of the mains are adapted for having service-pipes on each side, and both the mains and the service-pipes are constructed and laid down in such manner that the mains are free to expand and contract longitudinally without danger of breakage or liability of leakage. The mains are also capable of sustaining great pressure, and are adapted for preventing too great loss of heat between the places of supply and consumption of the heat and power agent employed.

The capacity of the steam-boilers in the boiler-house $A^2$ should be sufficient to afford a steady supply of steam to the main pipes F F′, or such other number of steam-mains as might be laid down, at a pressure within said pipes of about from forty to sixty pounds to the square inch of interior surface, which pressure it has been determined by experiment will be sufficient for the various uses desired within a district of the dimensions hereinbefore stated.

Figure 19:
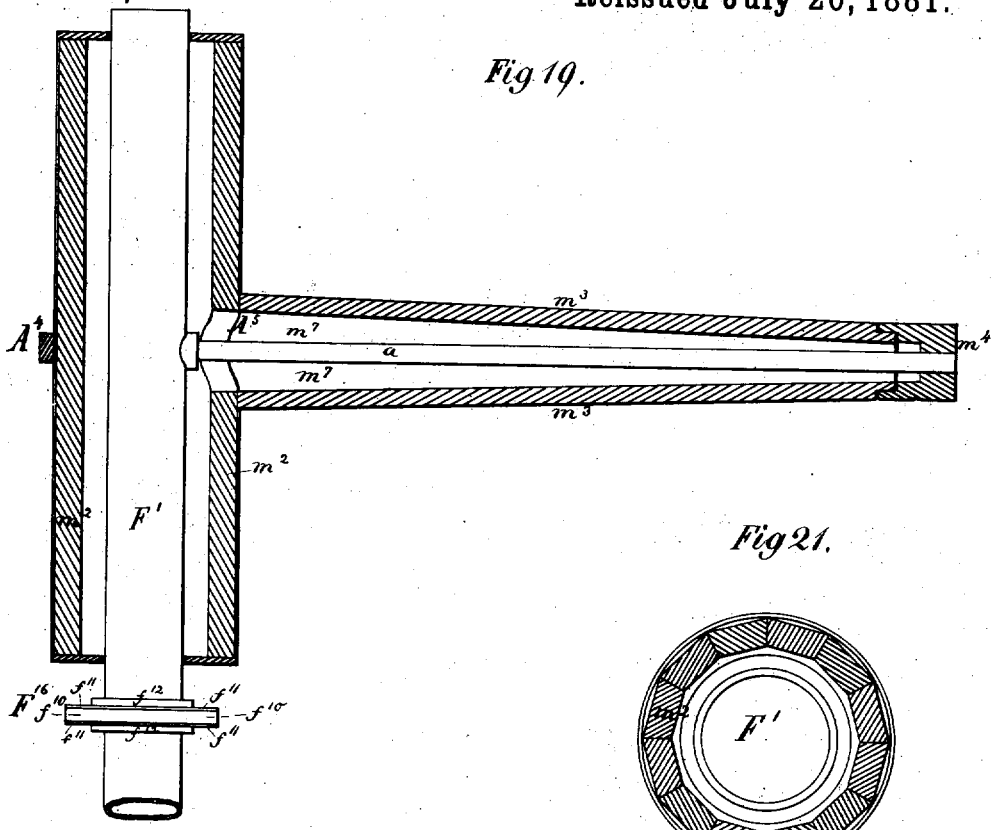

In rigorous climates—in fact, in all climates—the mains, although embedded beneath the surface of the ground at considerable depth, are subject more or less to longitudinal expansion or contraction, due to changes of temperature and other causes. Hence it is necessary to provide against the effect of such expansion and contraction, in order to avoid either breakage of the mains, leakage of steam, or other damage, which would make the use of lengthy underground steam-mains impracticable. To this end the sections of main pipe F′ must be allowed longitudinal movement independently of one another, either by sliding in stuffing-box joints, as is shown in Fig. 3, as will be presently described, or by attaching one section F′ to another section F′ by means of a short connection, $F^{16}$, as shown in Figs. 19 and 26. This connection consists of a ring, $f^{10}$, and two annular spring-plates, $f^{11}$. Around the central opening of the spring-plates the collars $f^{12}$ of the sections F′ are bolted. With this mode of joining the sections longitudinal movement of the respective sections F′ F′ is allowed by the spring-plates yielding somewhat like the elastic diaphragm of the regulator shown in Fig. 5 at K. When the plates yield either to a pulling or thrusting longitudinal movement of the sections F′ they assume a dishing form, and thereby accommodate themselves to the longitudinal expansion and contraction of sections F′, and thus an expansion steam-tight joint may be secured for the mains F′; but the preferable and most practical manner of securing this expansion and contraction joint is as follows: The mains at convenient points, about one or two hundred feet apart, are provided with junction service-boxes $F^{10}$,

BEST AVAILABLE COP' permanently embedded in the earth, and in which provision is made for the longitudinal movement of the end of a section of a main which enters the expansion-chamber of such box, while the chamber itself, being permanently attached to the permanent junction service-box, is not moved by such movement of the mains.

In Fig. 1, at $F^{10}$, one of the junction service-boxes is indicated, it being shown on the underground main $F'$ on the line of the street C, and in Fig. 2 an end elevation of Fig. 1 is shown, while in Fig. 3 a plan and partly-sectional view of such junction service-box, to be placed permanently or immovably in the ground along the line of the main pipe at intervals of about one hundred or two hundred feet apart, is shown. Each junction service-box is made of sufficient size, and with a trap-door to be accessible for repacking and repairing the expansion-joints of the mains, also the valves and other parts within the box. The interior of this junction service-box is at its bottom provided with an open or grate-like metal framework, $F^7$, for its proper support, and as a means whereby it may be firmly embedded in the earth, so as to hold the box $F^{10}$ and its expansion-chamber $F^8$ immovably in position.

The expansion-chamber $F^8$ is made of metal, and is firmly seated upon cross-plates $a'$ and between cross-plates $a^2$ of the frame $F^7$, and it is provided with a metal cover, $a^2$, which latter, when placed upon the expansion-chamber $F^8$, is held in position by screws $s$. Annular bearings, as at $a^4$, which project from two sides of the expansion-chamber, seat themselves in "gains" $a^5$ formed in the cross-plates $a^2$, and as a portion of this chamber, on two sides thereof, as at $a^6$, has a flush bearing against the inside surface of the cross-plates $a^3$ $a^2$, said chamber is thus firmly seated in a fixed position in the metal frame $F^7$. The inner surface of the bearings $a^4$ $a^4$ are screw-threaded and receive, as indicated in the figure, the ends of service-pipes $a$ $a$, which thus communicate with the expansion-chamber $F^8$, into the interior of which chamber (indicated at $F^9$) steam is admitted from the steam-main $F'$, and thence is passed into a building on either side of a street through said service-pipes $a$ $a$. The expansion-chamber $F^8$ serves a double purpose, to wit: It receives the thrust of the end $f^2$ of a section of the main $F'$ and permits such end to alternately move forward and backward in said chamber in accord with the longitudinal expansion and contraction of the main $F'$, and it also serves as a chamber from which the steam from the mains may be distributed through small service-pipes to buildings along a street. This provision for allowing the main sections to expand and contract longitudinally underground without liability of breakage or leakage is regarded by me as broadly new in connection with a system of means for warming districts of buildings or dwellings and furnishing power thereto for driving machinery; and as the means for securing this expansion and contraction may be various without departing from the invention made by me, I desire it to be understood that the permanently-fixed expansion-chamber $F^8$, or an equivalent contrivance, may be used independently of the junction service-box, either for the sole purpose of permitting expansion and contraction or to take steam from the mains at other points than the junction service-boxes—as, for instance, at a four-way branch, where one street connects with another, but does not cross, a service-pipe could be taken out from the fourth or unoccupied side of the four-way branch; and I do not limit myself to an expansion-chamber to receive the longitudinally-expansive thrust of the main pipe $F'$, which shall also serve as a chamber from which to distribute steam to the service-pipe $a$, as it may in some instances be desirable to use an expansion-chamber to receive the longitudinally-expansive thrust of the main pipe without having a service-pipe connected therewith.

In providing for a lengthening and shortening of the sections of the mains by longitudinal expansion and contraction, it is important that close-fitting joints between the sections be maintained; otherwise there would be leakage of steam and a great loss of heat and power. When the expansion-chamber, as shown, is used for allowing the sections of main to expand and contract it maintains a firm immovable position, and the joints between it and the respective sections are suitably packed, as will be presently described, or in any other equivalent manner.

In connection with the service-pipes of the expansion-chamber $F^8$, and also with other service-pipes, as occasion requires, cut-off valves, as at $f'$ $f'$ are provided, in order that the flow of steam from the main to the buildings may be cut off with a key-rod, $f^{12}$, when desired. To the inner screw-threaded ends of these service-pipes of the expansion-chamber, hoods $g$ and $g'$ are applied, and these hoods can be turned up or downward more or less, in order to admit into their open ends $i$ either dry or wet steam from the interior of the expansion-chamber $F^8$. In Fig. 3 of the drawings the hood $g$ is turned with its opening $i$ toward the zenith, and hence dry steam only will pass into its service-pipe, and thence into a building which the service-pipe enters, while the hood $g'$ is shown turned down to a horizontal position, thus admitting the wet steam, which will occupy a lower portion of said expansion-chamber; and, if desired, the hood may be turned down with its opening $i$ toward the nadir, in which case the commingled wet steam and water of condensation which may have accumulated in the bottom of the chamber will be forced through its service-pipe into the building connected therewith.

One wall of the expansion-chamber $F^8$, forward of its curved pc on $a^7$, terminates in a tubular portion, $a^8$, with inwardly-projecting shoulders $a^9$, which clo y fit and receive one end, $f^2$, of a section of the main $F'$. An annular space is thus formed between the por-

BEST AVAILABLE COPY tion $f^2$ of a section of a main and the parts $a^8$ and $a^9$ of the expansion-chamber for the reception of suitable steam-packing, $j$, so as to form a steam-tight joint around the end $f^2$ of a section of the main pipe F′. A removable metal ring, as at $e$, is made to seat itself on this packing $j$, and thus prevent the escape of steam, as will be hereinafter described.

Projecting from the opposite wall of the expansion-chamber $F^8$ are two sets of lugs, $g^2$, which receive eyebolts $g^3$, the bolts being retained in position within the lugs by a pin, as at $i'$. The forward ends of these bolts pass through doubly-beveled bolt-holes made in the rim of a sectional tube, G, the interior of which is flaring, as shown at $b$, and at the point $b'$, where the inner end of the tube G adjoins a convex ring, $g^4$, said tube is beveled, so as to form a perfect fit to the convexity of the ring $g^4$. A like fit is made between the opposite convex face of the ring $g^4$ and an annular projection, $a^{10}$, of the expansion-chamber $F^8$.

The convex ring $g^4$, it will be seen, is screwed upon the main F′, and may be removed at pleasure by disconnecting the eyebolts $g^3$ from the sectional tube G, and thus allow of the substitution of a new section of main-pipe when necessary.

It will also be seen that a section of the main F′, which has just been referred to as having the metal ring $g^4$ screwed thereon, passes through the sectional tube G, and that when the screw-nuts shown upon the bolts $g^3$ are tightened up the convex ring $g^4$ will be firmly seated against the annular projection $a^{10}$ of the expansion-chamber $F^8$, thus forming a steam-tight joint between $g^4$ and $a^{10}$, so that in the passage of the main supply of steam through the mains F′ no steam will waste through such joint; and, further, it will be seen that owing to the construction of this steam-joint between $g^4$ and $a^{10}$, and the like joint between the portion $g^4$ and sectional tube G, and the beveled portions $b$ on said tube, and the beveled bolt-holes in the rim of the tube G through which the bolts $g^3$ pass, the main pipe F′ on this side of the expansion-chamber $F^8$ is capable of deflection from a right line to accommodate it to the grade of the street, or to meet any other contingency of position, and thus provision is made against a strain falling upon the main pipes at or near their connection with the junction service-boxes, which strain would ensue from a deflection of said main pipes, due to any cause, from their proper position as first laid down, and by this means provision is also made against leakage of steam by reason of such deflection of the main pipes.

A short section of main pipe F′ is shown at $f^3$, having a screw-thread cut into its outer surface, so that one end of said section may be screwed into a corresponding opening in the wall of the expansion-chamber, as shown. The opposite end of this section $f^3$ engages with a metallic steam-discharging ring, $G^2$, which has apertures $h$ through it to admit of the free passage of steam from the main F′ into the interior $F^9$ of the expansion-chamber. By turning this discharge-ring in one direction it will be moved along upon the section $f^3$ a sufficient distance to allow of the removal of the metal ring or stuffing-box follower $e$, and thus give access to the packing $j$, and, should such packing need replacing, facilities therefor are thus afforded; and also, after the ring $e$ is thus removed, the steam-discharging ring $G^2$ may itself be removed either for repair or the substitution of a new one, its removal also giving access to the main F′. By turning said ring $G^2$ in an opposite direction to that just named, it will force the metal ring $e$ down upon the steam-packing $j$, as shown in Fig. 3, thereby packing the joint and preventing the escape of steam from the main, as well as from the expansion-chamber at the end $f^2$ of a section of the main F′, which enters said chamber. The outer surface of the end $f^2$ of the last-named section of main is intended to slide (when longitudinal expansion or contraction occurs) in contact with the packing $j$, and the forward end, $f^2$, of said section will be projected into the expansion-chamber $F^8$ more or less, according to the longitudinal expansion or contraction of the main F′ between any two junction service-boxes, or between the source of supply of steam to such main pipe and a junction service-box, $F^{10}$. This iron section of the main pipe F′ has its end $f^2$ plated or coated in a suitable manner—with nickel plate, for instance. The portion coated is that which comes in contact with the steam-packing $j$. This is done in order to avoid the great expansion which would occur were the section made of brass or other analogous bearing metal, also to avoid rust or corrosion and to secure a smooth anti-friction surface not subject to great expansion. In this manner simple expansion-joints, or expansion-joints in connection with steam-distributing chambers or junction service-boxes, or expansion-joints in connection with junction-boxes or expansion-chambers, may be applied at intervals where required throughout the whole system of the street-mains, thus rendering such mains practicable for the purposes herein described, notwithstanding the very considerable longitudinal expansion and contraction to which long lines of such main pipes are subjected by reason of varying temperature or from other causes.

The means described for providing against the injurious effects of longitudinal expansion and contraction of the mains and avoiding breakage and leakage thereof may be substituted by others which are the equivalent thereof, and therefore my invention is not confined to the precise form of construction shown, either of the expansion-joint, expansion steam-distributing chamber, expansion-chamber, or expansion junction service-box.

My invention provides for a longitudinal expansion and contraction of the pipe composing the underground steam street-mains between structures which are immovable, obviates the inconvenience, if not the fatal difficulty, which

BEST AVAILABLE COPY would ensue were such provision not made of having the longitudinal expansion or contraction of any one portion of the main added to the longitudinal expansion and contraction of all the other portions thereof; and while my invention of underground steam supplying street-mains with expansion-joints and stationary insulating media, as at $m^2$, embedded in the earth and made to inclose the mains and still not interfere with their expansion and contraction, is broadly new, and is not limited to the precise construction shown in Fig. 3, still I regard said construction, as shown in said figure, as the very best that can be employed, inasmuch as it is a very useful means for dividing up the longitudinal expansion and contraction of the mains, and for insulating, protecting, and sustaining the mains beneath the surface of the earth.

The steam-mains F′ throughout their entire extent, up to and slightly within the junction-boxes, are surrounded by a wrapping of asbestus, hair-cloth, or any other non-conducting substance, or with both asbestus and hair-cloth, as shown, thus confining and insulating the steam within the mains, and so preventing condensation and loss of heat. As insulating the mains with a suitable non-conducting substance is an essential object sought, I do not confine myself to the particular substances mentioned. The insulated mains are inclosed in a water-tight outside pipe, either of wood or iron lined with wood, and this pipe is then embedded in and covered, as in Fig. 24, first with sheet-zinc or tile, and thereafter with some porous substance like tan-bark or sawdust, to retain confined air, while underneath such outside pipe suitable drainage-pipes, $x$—tiles, for instance, as shown in Figs. 6 and 24—are properly laid and applied for carrying off water, which would otherwise collect around the mains in the trenches in which they are laid. This provision for drainage which I have made is very important, as the mains could not be as successfully used without a drain of some sort beneath them; and as my invention lies, in this regard, in providing a drain under the mains or in proper relation thereto, I do not confine myself to any particular form of pipe, tile, or drain device for conducting off water which may collect about the mains from any cause. In Fig. 3 of the drawings the asbestus wrapping is designated by $m$, the hair-cloth by $m'$, and the water-tight pipe by $m^2$, said pipe $m^2$ being carried into and connected with parts of the expansion junction service-box, as shown. The wood covering-pipe $m^2$ does not move with the iron mains, and retains a coupled connection with the junction service-box and expansion-chamber under the longitudinal expansion and contraction of said mains.

At some convenient point within each junction service-box $F^{10}$, and between its steam-expansion chamber $F^8$ and the source of supply of steam to the mains F′, a main stop-valve (indicated at V in Fig. 4,) will be applied to the mains F′, in order that steam may be cut off from the expansion-chamber $F^8$ during the act of repairs or an adjustment of the mechanism therein. From these mains the service-pipes $a$ conduct the steam to the buildings on either side of the street along which said mains may be laid, in which buildings the steam may be used for either or all of the purposes heretofore named, and to which my invention relates.

Figure 21:
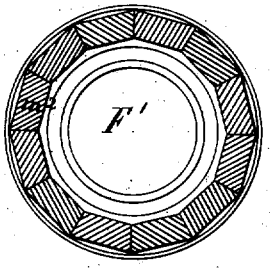
Figure 20:
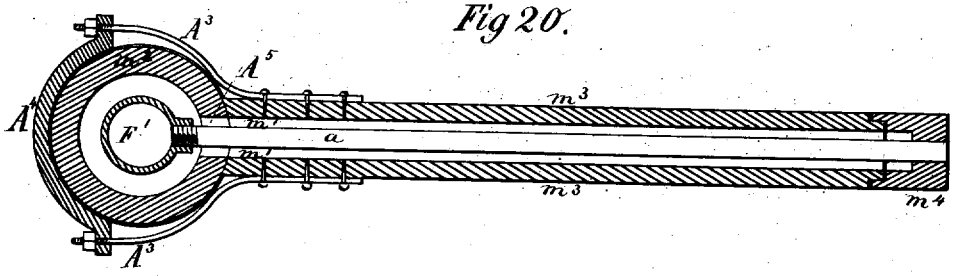
Figure 23:
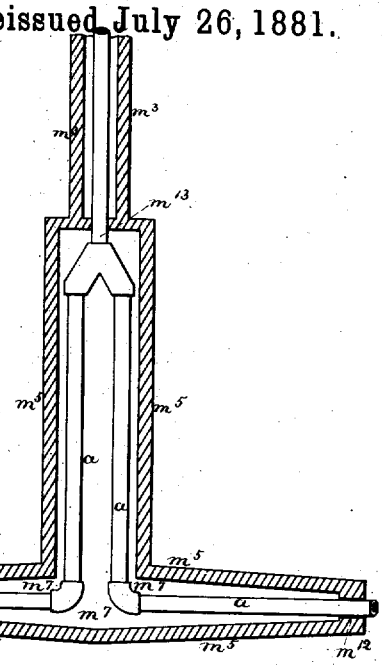
Figure 22:
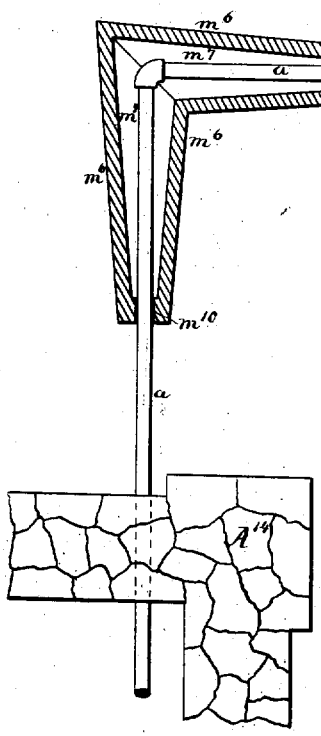

I have described the mains F′ as having a longitudinal movement by reason of their expansion and contraction; and now, in order to show that provision is made against undue straining of the service-pipes $a$, whether they pass at right angles from the mains to the building indicated at $A^{14}$, Fig 22, or around corners before reaching a building, making themselves a right angle either to the right or left, or both to the right and left, I will proceed to describe the plan shown in Figs. 19, 20, and 21 and the plans shown by Figs. 22 and 23. F′ in Figs. 19, 20, and 21 shows the main, which in all respects may be constructed, laid down, and protected as before described; and $a$ is a service-pipe leading out at right angles from said main to the curb-line, or to the back yard of a building. In plan, Fig. 19, the connection of the service-pipe $a$ with the main F′ is made by cutting an oblong hole, $A^5$, of about two inches length through the wooden pipe or covering $m^2$ of the main. To close this hole, which is made in order to allow the service-pipe, when longitudinal expansion and contraction take place, to vibrate between its inner end, $m^4$, and its connection with the main F′, a wooden tube, $m^3$, having an internal flaring expansion-chamber, $m^7$, is placed around the service-pipe from its inner end, $m^4$, to its connection with the main F′, and firmly strapped in place, as illustrated at $A^3$ and $A^4$, Fig. 20.

The joint around the oblong hole $A^5$ and between the wood pipe $m^2$ and the wood pipe $m^3$ is made water-tight in any proper manner.

It is evident that the service-pipe $a$, if made fast or impacted by earth at its end $m^4$, will still have freedom, by means of the flaring chamber of the wooden tube $m^3$ and the oblong hole $A^5$, to vibrate when the steam street-main F′ contracts and expands longitudinally, and this without much strain upon it, as the great length of the pipe between the fixed point $m^4$ and the point of connection with the main will cause the movement of the service-pipe at its fixed point $m^4$ to be exceedingly slight. Now, if the service-pipe $a$ is to be bent so as to form an elbow, as shown in Fig. 22, or is to be united to two elbows, as in Fig. 23, for the purpose of leading the steam into buildings not situated for a service-pipe such as is shown in Fig. 19, I would inclose it in a water-tight wooden casing such as is shown at $m^5$ in Fig. 23, or as is shown at $m^6$ in Fig. 22, accordingly as the case may require. The interior of these casings forms a flaring chamber, $m^7$, and the service-pipe $a$ is only impinged upon, and that loosely, at the points $m^9$ and $m^{10}$ in the plan shown in Fig. 22 and at the points $m^{11}$ $m^{12}$ $m^{13}$ in the plan shown in Fig. 23. With either of the con-

BEST AVAILABLE COPY structions shown by Figs. 22 and 23, the elbowed portion of the pipe *a* and all other portions thereof between the points which are impinged upon loosely and the elbows will have freedom to vibrate in the flaring chamber of the casings $m^5$ and $m^6$ to any extent that the longitudinal expansion and contraction of the service-pipe *a* may render necessary. Any equivalent of the means for allowing the service-pipes to move may be adopted.

I will now describe one practical plan for utilizing the steam from said mains in a dwelling within the district of buildings shown in Fig. 1, such description having reference to Figs. 5, 6, 7, and 8 of the drawings.

In Figs. 5, 6, and 8 the roadway of the street is indicated at H and the sidewalk at I.

In Fig. 5 a junction service-box, $F^{10}$, is shown beneath the street-roadway H, from which box, through one of its service-pipes *a*, steam is conveyed into a conducting-pipe, *n*, which leads into a steam-hydrant, P, situated upon the sidewalk. In this figure an ordinary water-main is indicated at R, from which, through pipe *r*, water is supplied to a street-hydrant, P′, from which water can be furnished to a city fire-engine, and through said engine, which is worked by the steam in the mains, elevated to any desired height and forced upon burning buildings and other objects being destroyed by fire; and in order to prevent the water in the hydrant P′ from freezing during the winter season the conducting-pipe *n* is made to impinge against such hydrant, as signified in Figs. 5 and 7, or in any other equivalent mode.

At Q in Figs. 5 and 8 a fire-engine is represented which has no boiler or fire, and which takes its steam from the steam-hydrant P through a steam pipe or hose, $y^4$, simultaneously with its supply of water from the hydrant P′ through a water-hose, $y^5$. The advantages of this part of the invention are apparent, in that the water in hydrant P′ is not liable to be frozen, and the steam in the hydrant P may always be up and ready for the engine. Besides this, the cost and weight of a fire-engine may be reduced about one-half that of any other. At the same time the alarming appearance caused by the fire, smoke, and noise with ordinary fire-engine, while running to a fire and working the engines, as well as attendant casualties, is avoided.

It may be stated here that the steam admitted to the steam-hydrant P can be at high pressure, and that proper cocks for letting on and cutting off steam to and from the same are to be provided.

In case there should be no city hydrant adjacent to the building to which steam is to be supplied, the conducting-pipe leading such steam into such building will connect directly with the service-pipe *a*. In this instance a conducting-pipe, *n′*, receives its steam from the conducting-pipe *n*, and thence passing into the building, as indicated in Figs. 5 and 7, may supply steam directly to a heater or radiator, L, and so warm an upper room, as shown in the latter figure of the drawings just mentioned, while a branch conducting-pipe, $n^2$, connecting with the pipe *n′*, may lead into another heater, as at L′, in the same or another apartment. Any equivalent means for those described may be adopted for preventing freezing of the water-hydrant and for supplying the steam-hydrant and fire-engines with steam, as well as for connecting the radiators with the mains.

It is desirable to regulate the supply of heat to a given building, and also to ascertain by measurement the amount of steam supplied under a given pressure, as well as record or register such such supply, in order that a uniform proper price may be charged to the occupant or proprietor of the building or other place for the steam used to heat the same and for other purposes. To this end a cut-off cock, *d*, is applied to the conducting-pipe *n′*, to compel the steam to pass into and through a steam-meter, by means of which the pressure and supply of steam may be primarily regulated and measured. The leading feature of this part of my invention for supplying heat and power from the described underground street-mains comprises the means shown in Fig. 9 at $c$ $c^4$ $c^7$ $c^8$ $n^3$ $n^4$, or any equivalent thereof, whereby the pressure of the mains is reduced as circumstances require and the steam measured. Another feature comprises the means shown in Fig. 5, as at K, or any equivalent thereof, whereby the pressure of the steam is regulated with respect to its use, and another feature comprises the means, as shown at M, Fig. 9, for effecting the recording of the amount of steam used, or any equivalent of such means. These several features, in connection with the steam-supplying mains hereinbefore described for supplying large districts of dwellings with measured and recorded quantities of steam for heating buildings and other purposes, are novel in connection with such mains, whether employed therefor singly or together with such mains, and therefore my invention is not confined to the combination of all these features, together with such mains, notwithstanding the fact that the best results will be secured when a steam-pressure reducing and measuring meter-valve, a recording or registering mechanism, and a regulating mechanism are used in combination with such mains, so as to act automatically, as hereinafter described, or in any other equivalent manner.

With reference to the special construction of the meter shown in the drawings, the steam-pipes $n^3$ and $n^4$ (see Figs. 7 and 9) connect the valve-chamber *c′* with the pipe *n′*, and cocks, as at *d′* and $d^2$, are applied to the pipes $n^3$ and $n^4$, so that when the cock *d* is closed and the cocks *d′* and $d^2$ are open the steam will pass into the said valve-chamber through pipe $n^3$ and out of the same through the pipe $n^4$ back to and within the pipe *n′*, and so on to the radiators L and L′, as well as to other parts hereinafter described. This meter is more clearly

BEST AVAILABLE COPY shown in Fig. 9 than in the other figures, and is preferably constructed mainly as shown, though other constructions might be used to effect the same results for which it is intended without departing from the invention which I have made.

In Fig. 9, $c$ is a metal cylinder, having a steam-chamber, $c'$, to receive steam through the pipe $n^3$, which connects with the pipe $n'$, (shown in Fig. 7,) hereinbefore described. The ends of this cylinder are closed steam-tight, with a properly-fitting stuffing-box, $c^2$, at one end, and with a steam-tight tubular valve-stem bearing, $c^3$, at its other end, as shown. Within this cylinder is a valve, $c^4$, which admits the steam from the chamber $c'$ into the pipes leading to the different rooms and radiators. This valve, in this instance, is of conical form, and it is connected at one of its ends with a valve-stem, $c^5$, and at the other end with a screw-threaded stem, $c^6$, which takes into a nut of the valve-stem bearing $c^3$. Said valve passes through an orifice, $c^8$, of an annular partition or diaphragm, $c^7$, of the cylinder $c$. The area of the opening or orifice $c^8$, where it surrounds the tapering portion of the cone-valve, must be of sufficient size to supply all the radiators required in a given building; or the area of said orifice should be about three-fourths of a square inch for every hundred thousand cubic feet of space to be warmed. The large end of this cone-valve $c^4$ should fill the orifice $c^8$ of the diaphragm, so as to form a close joint. The amount of steam passing through the diaphragm $c^7$ will depend upon the position of the cone-valve as it moves forward and back through said orifice $c^8$. The valve described, or any equivalent thereof for controlling the passage of the steam from the mains into the radiators or other places of use, operates for the purpose of measuring the quantity of steam used and reducing the pressure in the radiators or other places of use, whether combined with a recording mechanism, as shown at M, or not, also whether combined with an automatic diaphragm-regulator, as shown at K, or other equivalent regulator, or not.

In Fig. 9, M indicates clock-work of a recording mechanism regulated to keep good time, and which gives movement to a ribbon of paper, M'. This ribbon passes over and is moved forward by a roller, $r'$, fastened upon an extension of a shaft, which in ordinary clock-work gives movement to the hour-hand of a clock. The ribbon, in its forward movement, is held down upon the roller $r$ by another roller, $r^2$, which revolves loosely, the ribbon, passing between the rollers $r'$ and $r^2$ by reason of the clock mechanism, slowly rotating the roller $r'$. The ribbon M', as in Fig. 11, is ruled lengthwise with eight or ten black parallel lines, and with a red line on one edge, indicated at 8 8, which is termed the "zero-line" of the ribbon, and on which zero-line the pointer $i^2$ will rest when the valve $c^4$ is closed. It is also ruled with black cross-lines, as at 24-24, to represent days, and with lines, as at $e'$, to represent half-days, with lines $e^2$ to represent hours. Any number of these ribbons may be provided in advance of their use, as the same character of ribbon will answer for all the different sizes of meters within the district of buildings to which the steam is supplied, as well as for all pressures of the steam. As before stated, the amount of steam passing through the diaphrahm $c^7$ depends on the position of the cone-valve $c^4$, and its position is accurately recorded upon the ribbon M' by a pencil-finger, $i^2$, secured to a sliding bar, $i^3$, which latter is supported in a horizontal position by the frame of the clock-work, and in such manner as to allow of a side-wise movement either to the right or left. The bar $i^3$ has a clutch, $i^4$, attached to one of its ends, which clutch travels in a circular groove, $i^5$, cut around the valve-stem $c^5$, as shown, and at the opposite end of said bar a flat spring, as indicated at $i^6$, is secured to the bar. The spring moves with the bar to right and left, according as the bar in moved, and upon the plane surface of a metal frame, $L^2$, (shown in Figs. 7 and 8,) which incloses the cylinder $c$ of the meter, and also supports the clock-work M. The pointer $i^2$ is so adjusted in position upon the bar $i^3$ that its pencil will always press upon the ribbon M' at a point where the ribbon is in firm contact with the periphery of the roller $r'$, while at the same time the clutch $i^4$ is so adjusted on said bar as to travel in the groove $i^5$ of the valve-stem $c^5$, and in these positions said bar and clutch are always held by the tension of the spring $i^6$ upon the frame $L^2$ during the forward and backward movements of the valve-stem $c^5$ and cone-valve $c^4$. In other words, the pencil-finger $i^2$ is automatically held to its work by the spring $i^6$, and as the pencil is moved crosswise of the ribbon through the connection of the bar $i^3$ with its valve-stem $c^5$, the slightest movement of the cone-valve $c^4$ will be felt by the pencil and such movement recorded upon the ribbon M', as indicated by the zigzag line on said ribbon in Fig. 9. The cone-valve $c^4$, it will be seen in the figures of the drawings, is moved backward or forward through the diaphragm $c^7$ by a screw-movement, as indicated at $c^3$ and $c^6$, such movement being produced through suitable mechanism. It is practicable to effect the opening and closing of the valve as required by a lever without revolving the valve.

I will here state that while the steam in the mains as well as in the valve-chamber $c'$ is always at a high pressure, yet by being wire-drawn around the cone-valve through the diaphragm the steam is reduced to low pressure, and in this condition can be safely used for warming the building. My object in using high pressure in the mains F' and low pressure in the dwellings is to keep the said main as small as possible, as by this means expense will be avoided and loss of heat by condensation prevented, while with low pressure in the

BEST AVAILABLE COPY buildings there will be less liability of leakage in joints, valves, and packing, and greater safety against explosion is secured.

Each differently-sized meter should have its number, and each ribbon of paper should be numbered to correspond with the number of the meter on which it is to be used, and this being done, the value of the steam used indicated between the longitudinal lines will be known by its number. This value may be computed with considerable accuracy by the area of the diaphragm-aperture $c^8$ and the velocity of the steam at given pressure. It should be borne in mind that the amount of steam recorded depends on the velocity of the steam through the diaphragm $c^7$; but when greater accuracy is required a company or producer supplying a city or town with these steam-works should be provided with an apparatus for that purpose consisting, simply, of a surface-condenser or coil of pipe submerged in cold water, of sufficient size and length to condense all the steam that will pass through the largest meters in a given time. Then the value is obtained as follows: Supposing the meter is to be used with a pressure of forty pounds above the cone-valve $c^4$ and at or near the pressure of the atmosphere below the cone-valve, as at $n^4$, Fig. 9, first close the cone-valve $c^4$, and thus station the pencil $i^2$ on the zero or red lines 8 8 of the ribbon; then open the cone-valve until the pencil reaches the first black line, 7, which runs lengthwise with the ribbon, and there stop. This will allow a small quantity of steam to pass into the condenser, (the condenser being attached to $n^4$ or other convenient pipe communicating with $n^4$,) where it will be condensed and come out pure distilled water. Let the cone-valve remain open one hour, then close it and weigh the water, and by multiplying the weight in pounds by 27.7 the number of cubic inches of water will be ascertained, and as every cubic inch of water was a cubic foot of steam at the pressure of the atmosphere before entering the condenser, a multiplication of the cubic feet of steam by 24 (the hours in a day) and this by 30 (the days in the month) will give the number of cubic feet of steam for one month. Then again open the valve $c^4$ till the pencil $i^2$ reaches the second black line, 6, running lengthwise of the ribbon, and repeat the process at each of such lines until the cone-valve $c^4$ is wide open, the movement of the valve during these operations being effected by a hand-key, $k$, Fig. 8, applied to $k'$ of the valve-stem $c^5$.

If the result of the above test should show an increase of one hundred cubic feet of steam for every successive longitudinal line reached by the pencil over the number of cubic feet shown for the immediately preceding longitudinal line, then the meter would be of proper size for a dwelling or other building containing fifteen thousand cubic feet of space to be warmed. I will suppose this meter to be in operation in a dwelling, and at the end of a month the amount recorded averaged five full spaces, and each of such spaces between $e^3$ $e^8$ and between 8 to 7, and so on, of the ribbon M′ represents the consumption of one hundred cubic feet of steam for one hour. To obtain the cost for one month or one year is as follows: Example: one hundred cubic feet per hour multiplied by the number of hours in a day shows the consumption of twenty-four hundred cubic feet each day, which, multiplied by the number of days in a month, shows the consumption of seventy-two thousand cubic feet for one month, which multiplied by 2 (the number of cents charged for a thousand cubic feet,) will amount to one dollar and forty-four cents per month for each full space, and such sum multiplied by 5 (the number of spaces) will make a total sum of seven dollars and twenty cents per month, or a grand total of fifty-seven dollars and sixty cents per year if the said value per month is multiplied by 8, which is the estimated year's use of steam for warming the building.

The ribbons M′ may be collected once a month and any broken spaces indicated by the pencil arranged or computed before they go to the book-keeper, who, having a table with the price per month of each of said full spaces of the ribbons for the different-size meters, will know at once how to make out his bills.

The meter described will work practically correct even if the mean pressure of steam should vary five pounds either way from forty pounds pressure, in which case the loss or gain to the consumer would not exceed two per cent.

I have described the meter shown in Figs. 9, 10, and 11 only as a meter for steam; but it is equally as good for measuring many other fluids, either hot or cold, where the pressure below the cone-valve is less than above it. It may be opened or closed by hand, or, after having been slightly opened, it may be more or less opened or closed automatically by the pressure of the steam below the valve, and thus the steam in the house kept at a uniform pressure, as will be hereinafter shown. I also have specially spoken of transmitting steam through long lines of underground street-main pipes having expansion-joints; but that part of my invention—viz., of supplying heat and power through mains such as described—is not confined to steam as the heating and power agent, as such mains are equally useful for supplying either hot water or heated air for heating and power purposes; but I prefer to use steam in connection with such main pipes. As the steam passes out of the meter, Fig. 9, through the pipe $n^4$, back into the pipe $n'$, it will be under low pressure, and pass directly into the radiator L through pipe $n'$, and into the radiator L′ through pipe $n^2$, the cocks $d^3$ and $d^4$ of the radiators being opened for this purpose; also, through pipe $n^5$ into a pressure-gage, $G^3$, to indicate the pressure in the building; also, through pipe $n^6$ into a diaphragm-regulator, K, connected with the key of the meter, to regulate the pressure in the building, as will be presently described.

In Figs. 7, 12, 13, and 14 a steam-trap is

BEST AVAILABLE COP' shown. This is constructed expressly for use in connection with my improved apparatus for warming buildings, and it answers a double purpose—that of a reheater and a steam-trap. In many places it may be used as follows: For instance, in order to warm a large dwelling or store, as indicated in Fig. 7, where there are a number of radiators in the rooms above the ground, the steam will come into the basement through the regulator, thence through the meter, then up through all the radiators, as just described, the condensed steam being returned to the basement through pipes $n^8$ $n^9$ and junction-pipe $n^{10}$ into the trap I′. The balanced float $f^4$, being open at the upper end, as shown, receives the water from the returning-pipe $n^{10}$, and will remain full or up to the top of its center tube, $t$. The top of the tube $t$ and the water in the float $f^4$ being about eight inches higher than the water surrounding the float gives the water in the center tube, $t$, that much "head," and forms a current of hot water down through the bottom of the float. The temperature of the descending water, being hotter than that in the trap below, will increase its temperature and cause it to ascend in the space $t'$ between the float and the interior of the trap I′, a little above the pipe $n^{11}$, through which pipe it will leave the trap and circulate through a radiator, $L^3$, in the basement, then back through pipe $n^{12}$ into the bottom of the trap I′, when it ascends and is reheated by the hot water descending through tube $t$. If the temperature of the circulating water is too low to warm the basement-radiator $L^3$, live steam, by opening the valve $d^3$, can be admitted to the trap through the pipe $n^7$, coiled, as at $h'$, in the bottom of the trap, and so reheat the water and raise its temperature as high as required. The steam condensed in this coil $h'$ will be forced up through the pipe $n^7$ into the top of the trap I′ and increase the temperature of the water descending through the center tube, $t$. When the water rises too high in the trap the float $f^4$ (which is connected by a rod, $u$, and a cord, $u'$, to a lever, W, as shown) will ascend and lower the weighted end of the lever W, which, by means of the rod $w$ and lever $w'$, will open the cock $w^2$ in a waste-pipe, $w^3$, which communicates with the trap I′ through the pipe $n^{12}$, and thus allow the surplus water to pass off into a hot-well, Z; and if at the same time it should be desirable to heat a greenhouse with the water of condensation returned to the trap, a hot-water pipe, as in Figs. 6 and 7 at $n^{13}$, may be used to lead such water from pipe $n^{11}$, which connects with the trap I′, to the greenhouse H′, and through heating-pipes therein, and thence be returned through pipe $n^{14}$ to pipe $n^{12}$, and thence to the trap I′, in which it is reheated for repeated circulation, while all surplus water will be discharged into the hot-well Z, as before described. A way-cock, as at $d^6$, is provided for the pipe $n^{11}$, and pipe $n^{13}$ will be provided with a similar cock.

It is manifest that the hot water from the trap may be carried through the pipe $n^{11}$ to a tank in the kitchen of the building, there to be used for culinary and other domestic purposes, a return-pipe being provided to return the water from such tank to the trap I′, in a like manner as provided by pipe $n^{12}$ for returning the hot water from the heater $L^3$ to said trap; and in like manner hot water can be supplied for use throughout the building wherever needed. In this manner I am enabled to utilize, either in the condition of steam or in the condition of hot water, nearly all the heat let into the building.

I will state here that, while I prefer to use the trap just described, it is practicable to use a trap of ordinary construction with good results for the purpose of heating by steam only. Such ordinary trap is shown in Fig. 25 of the drawings, and it only differs as a trap proper from the trap shown in Fig. 12 in having the center tube of that trap removed and the bottom of the float closed at the point where the tube formed an opening through it, or, in other words, in making this float solid and of suitable material. In such ordinary trap the surplus water would be discharged in the usual manner through a waste-pipe, $w^3$, having a waste-cock, $w^2$, and be conveyed into the well Z.

In the foregoing description the trap I′ has been spoken of as a reheater for warming either the basement of buildings or greenhouses by circulating hot water; but this combined trap and reheater need not be used simply to heat such localities. If desired, the trap proper may, for instance, be located in the upper story of a building, and warm all parts of the building, as well as a greenhouse, by circulating hot water from such upper story, as signified by Figs. 15 and 16, and there being no danger from fire by its use, the trap proper (section $e^2$) may be located in any back hall or closet. In this mode of use the trap is shown with its outer shell or cylinder made with two sections or main parts—viz., an upper part, $e^2$, in which the float operates, and a lower one, $e^3$, in which the coil $h'$ is located, the two sections freely communicating through an annular opening, $b^2$. There are thus practically a float-chamber for the upper section and a coil-chamber for the lower section, the two communicating through $b^2$.

We will now suppose that it is desirable to locate the trap proper in the third story of a dwelling, as in Fig. 15. In this case the coil-chamber or lower section, $e^3$, will be located in the basement, and thus act partially as a heater for such room, while the upper section, $e^2$, will be located in the third story of the house, and thus act partially as a heater for such story, and from this latter section $e^2$ the hot water will circulate through all the radiators on that floor, then descend to the next, and so on until it reaches the basement, from whence it may circulate through a greenhouse, H′, and finally be returned to the bottom $e^3$ of the trap, and so be reheated for repeated circulation, while all surplus water may be discharged into a hot-water well, Z, as signified in Fig. 7. In this supposed case the live steam, after pass-

BEST AVAILABLE COPY ing through the meter, is taken from the pipe $n'$ (shown in Fig. 7) into an upright, as at V', Fig. 15, from which the steam passes through the pipe $n^7$ and its coil $h'$ in the section $e^3$, along up said pipe $n^7$, and discharges into the upper section, $e^2$, in the third story. The corresponding parts of the trap shown in Figs. 7 and 15 perform the same function and are designated by the same letters of reference.

It will be seen that any one or more of the buildings situated within the district of dwellings or buildings signified in Figs. 1 and 2 can at option be heated either by steam or by circulating hot water, as may be desired, or parts of the same building may be heated by steam, while other parts may be heated by circulating hot water, the agent for doing all this being the steam generated in the building $A^2$, located at or near the center of said district, and passed through main F' under high pressure.

In Figs. 17 and 18 a pressure-gage is shown for indicating the pressure of steam let into the radiators and other steam-fixtures of a dwelling. This gage may be situated in the basement of a building, as indicated in Fig. 7, and it may receive steam through the pipe $n^5$ when the steam leaves the meter, as shown in said figure. It consists of a cylindrical frame, $e^4$, its upper extended portion, $e^5$, being provided with a scale indicating pounds and half-pounds, as at $b^4$. It is provided with an index-pointer, $i^7$, pivoted at $p$, and with a short lever-arm, $p'$, which receives a rod, $p^2$, attached to a rear portion of a vertical lever, $p^3$. The extremity of the curved rear portion of this lever $p^3$ seats itself loosely beneath a projecting part of an annular rim, $t^3$, while a projecting portion, $r^2$, rests upon a boss which is secured centrally upon a flexible diaphragm, $t^2$, which covers and is secured over the steam-chamber $c^{10}$ of the gage, as shown. A rod, as at $p^4$, connects the lever $p^3$ with a flat spring, $p^5$, secured at the rear end of the frame $e^4$. This spring, when not under tension by the action of the steam in the chamber $c^{10}$, will cause the pointer $i^7$ to rest at the zero-point of the scale $b^4$, and to this normal position the pointer will always return after the pressure of the steam has ceased to act within the chamber $c^{10}$. As seen in Fig. 17, the pointer is supposed to be at zero and the diaphragm $t^2$ at rest. If steam is now let into the chamber $c^{10}$ through pipe $n^5$, the flexible diaphragm $t^2$ will be forced outwardly from the steam-chamber, thus forcing outwardly the forward part of the lever $p^3$, and at the same time drawing down the rod $p^2$, which, in turn, draws down the short arm $p'$, thus causing the pointer to move forward upon the scale $b^4$. This act puts the spring $p^5$ under tension, and it will remain under any given tension corresponding to a given pressure of steam so long as such pressure is maintained, and as the pressure varies the pointer will indicate the varying pressure upon the scale, and when all pressure ceases the pointer $i^7$ will return to its normal position at the zero-point. Any equivalent means may be substituted for the gage just described. The steam, after passing through the meter, which, as shown in the drawings and hereinbefore described, comprises the cylinder $c$, with a perforated diaphragm; and the valve $c^4$, or the equivalent thereof, also passes from pipe $n'$ into a pipe, $n^6$, which conducts it into a diaphragm-regulator, K, or any other equivalent regulator. (Shown in Figs. 5 and 7.) This regulator is connected with a key, $k$, upon an arbor, $k'$, on the end of the valve-stem $c^5$ of the cone-valve $c^4$ and regulates the pressure of the steam within the building. This regulator is of simple construction, having a steam-chamber, $c^{11}$, to receive steam from pipe $n^6$, and a flexible diaphragm, $t^4$, held in place by an annular ring, $t^5$, similar to that shown in Fig. 17. A lever, $l$, is pivoted at $j'$, at its rear end, to an upright projection of the ring $t^5$, and a downward projection, $l'$, of the lever rests upon a boss secured to the flexible diaphragm $t^4$, corresponding to the boss shown in Fig. 17. The lever is provided with a movable weight, $w^5$, which may be slid along the bar as desired. A cord, as at $u^2$, has one end secured to the forward end of the bar, while the other end of the cord is secured to a weight, $w^6$. This cord, when the regulator is to come into action, is passed over a sheave, $y$, of the key $k$, (shown in Figs. 5 and 8.)

I will now suppose the valve $c^4$ to be closed, and that the operator desires to let a quantity of steam into the radiator L sufficient to heat it, and that such quantity will be furnished at $k$ pressure of two pounds. To do this the key a is turned forward by the hand of the operator, thereby opening the valve. The forward movement of the key is continued until the pressure-gage $G^3$ indicates the two-pounds pressure. This done, the operator raises the cord $u^2$ over the sheave $y$ and adjusts the weight $w^5$ along the lever $l$ of the regulator K until the lever $l$ assumes a horizontal position, as indicated in Fig. 5, care being taken during such act not to further open the cone-valve $c^4$. This being done, a steady heat at two pounds pressure of steam will be furnished said heater. After a while it becomes necessary to heat the radiator L', and accordingly the inlet-valve $d^4$ is properly turned and steam admitted. This act at once reduces the two pounds pressure in the chamber $c^{11}$ of the regulator K, whereupon the weighted lever $l$ will commence to fall down below a horizontal position, and so draw upon the cord $u^2$, at the same time elevating the weight $w^6$, and thereby opening the cone-valve until the given pressure is re-established for both heaters, the same as it had been for one only. After another interval of time it may be found desirable to only use one of the heaters L L'. Accordingly the steam is cut off from radiator L', for instance, and this act increases the steam-pressure in the regulator. This extra pressure in the chamber under the diaphragm of the regulator will accordingly raise the weighted lever $l$ and close the cone-valve just enough to keep the right

BEST AVAILABLE COP' supply of heat to the radiator L, and practically under the original two pounds pressure. Any equivalent regulator may be adopted in lieu of the one described and shown.

In large cities many narrow streets during the winter season become at times so much obstructed by snow and ice as to impede travel, as well as entail a heavy expense for the removal of the same. Therefore, in carrying out my improved mode of heating buildings in cities and other large towns, I provide for a ready and inexpensive removal of such snow and ice, as indicated in Figs. 6 and 8 of the drawings. In the latter figure, at one side of the street H an opening, $f^5$, is made along the sidewalk-curb $b^6$, a cover, $f^6$, being provided for such opening when not in use. This opening $f^5$ leads into a large underground tank or box, $B^3$, provided with an exit-pipe, $n^{15}$, which is made to communicate with an underground sewer of the city or town. This box $B^3$ may be located near one of the steam-hydrants P above described; or, if deemed best, a special steam-hydrant, as at $P^2$ in Figs. 6 and 8, may be provided at convenient points on the sidewalks I. Such hydrant $P^2$ is made to take steam from one of the street-mains, F', through a pipe, $n^{16}$, and it is also provided with proper valves to let on and cut off the steam when desired. A pipe, as indicated at $n^{17}$, Fig. 8, situated near the steam-hydrant $P^2$, passes from near the surface of the sidewalk down into the box $B^3$, and is coiled upon the bottom of said box. This coil may be perforated, or it may be imperforated, but open at its termination, so that a heavy flow of high-pressure steam or other equivalent heated agent may be let into the box. The opening $f^5$ is of such width and length as to admit of one, two, or more cart-loads of ice and snow gathered from the streets to be dumped through it at one time, and with steam let on during such dumping the snow and ice will be melted and water will run off into the sewer of the city with great rapidity.

At $f^{18}$ I have shown a short connection-pipe between the hydrant $P^2$ and the pipe $n^{17}$, leading into the box $B^3$. This connecting-pipe need not be used except when steam is let into the box $B^3$, and when not wanted for such purpose it can be removed and its cover $g^6$ adjusted over the pipe $n^{17}$.

I thus have provided a cheap means for freeing streets from accumulations of snow and ice; and, if needed, an auxiliary steam-pipe, as at $n^{20}$, connecting with the hydrant $P^2$, can also be brought into action, either to melt the snow in the box or for clearing the sidewalks and street of snow by turning hot steam thereon.

In my aforegoing description I have illustrated and described a practical way of distributing steam and the condensation of steam throughout buildings within a district of buildings, signified in Figs. 1 and 2; but I do not confine myself to the relative location of the several devices employed for such purposes, nor to the precise construction and arrangement of the mechanism employed, as the same may be varied according to the locality and surrounding circumstances, and as the mechanical skill of workmen may suggest, without departing from my invention.

In the use of my invention it is manifest that in some instances, where the steam is to be used as a motor for propelling machinery or doing other work, and under higher pressure than is necessary for simply warming a building, the steam may be, as indicated in the drawings, conducted directly to an engine in a building in the said district of buildings by a steam-pipe connecting with an outlet-pipe, as signified at $n^4$, of a meter shown in Figs. 7 and 9. In such case a meter might be used of a size large enough to pass such a volume of steam and under such pressure as would suffice to furnish the power required, and a record be made of the amount of steam used by the recording or registering mechanism; or a rubber hose might have one of its ends connected with the high-pressure-steam pipe $n'$ or pipe $n^3$, Fig. 7, before the steam enters the meter, and its other end movable, so that it could be taken to any part of the house to extinguish small fires, or for the purpose of boiling clothes, running washing-machines, sewing-machines, or other machines requiring power to work them.

Finally, I would state that in case any hissing noise should be communicated through the steam-pipes leading from the meter to the radiators in rooms above, the same may be remedied by having such pipes made with a short section of rubber tube at some convenient point of their length in the basement.

From the aforegoing specification it will be seen that by my invention set forth means are provided for performing the multifarious work of heating buildings, furnishing power for machinery of various kinds, supplying steam itself for extinguishing fires and for raising water to extinguish fires, preventing freezing of water-hydrants, expeditiously and economically melting ice and snow in the streets, and for supplying steam and hot water for culinary purposes, the same being adapted to the wants of a great number and variety of customers, and reducing the pressure and measuring to each the quantity of steam, and the whole comprising a system answering to the necessities of all classes of people in a district of a city or village.

Before stating my claims I will here say that, while it has heretofore been proposed to convey steam through an underground pipe in which no provision was made for permitting longitudinal expansion and contraction of such pipes or the sections thereof, a practical system of heat and power supplying mechanism has never heretofore been devised which comprised as a part thereof manifold lines of main steam-pipes from which to supply heat and power to buildings along the streets of a district of buildings in a town or city, as signified at F', Fig. 1, such mains being adapted to retain the

BEST AVAILABLE COP' heat of the steam, and also having their sections so jointed that expansion and contraction longitudinally are permitted without danger of breakage of either the mains or the service pipes leading therefrom, and without danger of leakage of steam at the joints. This foundation part of my said system primarily insures the utility of the many other features of invention shown, and therefore is specially mentioned here.

What I claim as my invention, and desire to secure by Letters Patent, is—

1. Stationary expansion-joint junction-boxes for insulated underground street steam-mains, substantially as described.

2. Stationary expansion-joints for insulated underground street steam-mains, substantially as described.

3. Stationary expansion-joint junction service-boxes for insulated street steam-mains, substantially as and for the purpose described.

4. A street-main expansion-chamber, $F^8$, substantially as described.

5. An adjustable hood, $g$, in combination with street-main $F'$, service-pipe $a$, and an expansion-chamber which serves as a steam-chamber, substantially as described.

6. The combination of the expansion-chamber $F^8$, the street-main $F'$, screw-threaded as at $f^3$, the adjustable ring $G^2$, and the follower $e$, substantially as and for the purpose described.

7. The wall of the expansion-chamber $F^8$ of the junction-box $F^{10}$, made to support the inner end of the outer wooden covering, $m^2$, of the main, substantially as and for the purpose described.

8. The wall of the expansion-chamber $F^8$ of the junction-box $F^{10}$, made to support the inner end of the main $F'$, substantially as described.

9. The section $f^2$ of the main, coated or plated with nickel plate or any equivalent anti-corroding metal, substantially as and for the purpose described.

10. The water-tight insulating and sustaining case $m^2$, or its equivalent, for underground street steam-mains, substantially as and for the purpose described.

11. The combination of wooden covering-pipe $m^2$, or its equivalent, with underground heat or power supplying street-mains, suitably insulated, and provided with suitable service-pipes, and with junction service-boxes, substantially as and for the purpose described.

12. The combination of wooden pipes $m^2$, or their equivalents, expansion-chamber $F^8$, and underground street-mains $F'$, substantially as and for the purpose described.

13. Underground steam street-mains, suitably insulated, and laid beneath the earth in a non-conducting case, and provided with drain-tile or its equivalent, such tile being applied outside the said case, substantially as and for the purpose described.

14. Tile or equivalent means of drainage, in combination with underground street-mains, heat-radiators, and a steam-trap, substantially as and for the purpose described.

15. The combination of drain tile or pipes with underground heat or power supplying street-mains, insulating media, and suitable service-pipes, substantially as and for the purpose described.

16. The combination, with underground heat or power supplying mains which are suitably insulated and are provided with suitable service-pipes, of stationary junction-boxes which permit longitudinal expansion and contraction of the mains, substantially as and for the purpose described.

17. Underground street-mains connected with heat and power supplying apparatus, and with stationary junction-boxes which permit expansion and contraction of the mains longitudinally, and with heat-radiators in a building contiguous to streets wherein the mains are laid, substantially as and for the purpose described.

18. A meter, in combination with an underground heat or power supplying street-main and a steam-supplying apparatus, substantially as and for the purpose described.

19. The meter-cylinder $c$, having an inlet, $n^3$, an outlet, $n^4$, and an annular diaphragm, $c^7$, in combination with a longitudinally-adjustable valve, $c^4$, a laterally-traveling pencil-finger, $i^2$, clock-movement M, and ribbon M', substantially as and for the purpose described.

20. The spring $i^6$, in combination with the bar $i^3$, the pencil-finger $i^2$, clutch $i^4$, and valve-stem $c^5$, substantially as and for the purpose described.

21. A steam-trap in combination with underground street-mains connected with steam-supplying apparatus and with a heat radiator or radiators, substantially as described.

22. A steam-trap which serves the double purpose of a reheater and a steam-trap, in combination with underground street-mains connected with steam-supplying apparatus and with a heat radiator or radiators, substantially as described.

23. The combination, with the trap I', having connected chambers $e^2$ and $e^3$ and pipe $n^{11}$, of the conducting-pipe $n'$ and steam-pipe $n^7$, having a coil, $h'$, substantially as and for the purpose described.

24. The suspended trap-float $f^4$, provided with a tube, $t$, of less height than the depth of the chamber of the float, in combination with the pipe $n^{11}$, pipe $n^{12}$, cock $w^2$, and pipe $w^3$, substantially as and for the purpose described.

25. A reheater interposed between radiators which are heated by steam from the source of supply and radiators which are heated by water of condensation from the same steam, substantially as and for the purpose described.

26. The reheater-pipe $n^7$, in combination with the trap I', substantially as and for the purpose described.

27. A water-hydrant, in combination with

BEST AVAILABLE COPY an underground street steam-main which is in connection with steam-supplying apparatus, whereby the water in the hydrant is prevented from freezing, substantially as described.

28. A street steam-hydrant, in combination with an underground street steam-main connected with steam-supplying apparatus, substantially as and for the purpose described.

29. A street steam-hydrant connected with the street-main F′ and located in close contiguity to a water-hydrant which is warmed by a pipe, *n*, connected to said main F′, whereby steam and water may at all times be simultaneously supplied from the same locality to a fire-engine for extinguishing fires, substantially as described.

30. An automatic regulator or governor into which a portion of the supply-steam enters on its passage from the underground mains to the points of use, in combination with underground heat or power supplying mains which are suitably insulated, protected, and sustained, and are provided with stationary expansion-joints, substantially as and for the purpose described.

31. The combination, with heat and power supplying street-mains having expansion-joints, and being suitably insulated and provided with suitable service-pipes, of a pressure-indicating gage and automatic pressure-reducing and pressure-regulating contrivances, substantially as and for the purpose described.

32. Underground street-mains having expansion-joints, and being inclosed in a stationary non-conducting insulating-case, and connected with steam-supplying apparatus, and with a heat radiator or radiators, and with an automatic steam regulator or governor into which a portion of the supply-steam passes on its way from the mains to the points of use, substantially as and for the purpose described.

33. The combination, with underground street steam-mains having expansion-joints, and being inclosed in a stationary non-conducting insulating-case, and otherwise suitably insulated, of one or more than one radiator, a pressure-controlling valve, and a pressure-regulator, into the latter of which a portion of the steam from the mains passes on its way to the places of use, while through the former all the steam supplied from the mains to the radiators is passed, whereby the same determined pressure of steam is practically maintained either in one radiator or in more than one radiator, whether one radiator or more than one radiator is in use at the same time, substantially as described.

34. Underground heat or power supplying street-mains inclosed by a stationary non-conducting and insulating case and otherwise suitably insulated, and their sections united by stationary connections which permit expansion and contraction longitudinally, in combination with heat and power supplying apparatus, and with means for reducing and controlling the pressure of the steam passed through the said reducing and controlling means, and used for heating and furnishing power, substantially as described.

35. Underground steam-mains the sections of which are united by expansion joints and sustained by a stationary protecting and insulating casing, substantially as and for the purpose described.

36. Underground service-pipes of underground steam-supplying mains provided with casings $m^5$ and $m^6$, said casings serving for preventing the major portion of the service-pipes from becoming impacted with earth, and permitting them to move laterally along a portion of their length when the mains expand and contract longitudinally, substantially as described.

37. Underground snow and ice reservoirs having open-ended or perforated steam-pipes within them for the admission of steam into said reservoirs, in combination with steam street-mains connected with steam-supplying apparatus, substantially as and for the purpose described.

38. Underground steam street-mains connected with steam-supplying apparatus and with a heat-radiator of a building, and with underground snow and ice reservoirs having open-ended or perforated steam-pipes within them for the admission of steam into said reservoirs, substantially as described.

39. The combination of pipes for discharging steam upon snow and ice to be melted with underground steam-mains having stationary expansion-joints and a stationary insulating and protecting casing, and connected with steam-supplying apparatus, substantially as and for the purpose described.

40. A section of an underground street steam-main held stationary at one of its ends, while its other end is fitted loosely, but steam-tight, to another section of such main, which latter section is in like manner held stationary at one end, while its other end is fitted loosely, but steam-tight, to another section, and so on throughout the lines of mains, substantially as and for the purpose described.

41. Underground heat or power supplying street-mains constructed to pass along the line of the street to and crossing other streets, and connected with other like mains leading out through other streets or districts, as signified at F′ in Fig. 1 of the drawings, said mains being inclosed by a stationary non-conducting insulating-case or its equivalent, and otherwise suitably insulated, and their sections provided with suitable means for allowing them to expand and contract longitudinally beyond the points where they are held and supported at one of their ends, and also connected with a general heat and power supplying apparatus and with the respective buildings of a district of buildings, and serving for furnishing heat and power, or either, to consumers in such district of buildings, substantially as described.

42. The combination, with underground heat and power supplying mains inclosed by a stationary non-conducting insulating-case, as at $m^2$, or its equivalent, and otherwise suitably

BEST AVAILABLE COP insulated, and provided with means for allowing their expansion and contraction longitudinally beyond the points where they are held and supported at one of their ends, of service-pipes which are permitted to move laterally at one of their ends with the mains while the sections of the mains are expanding or contracting, substantially as described.

43. The combination, with underground heat and power supplying street-mains inclosed by a stationary non-conducting insulating-case, as at $m^2$, or its equivalent, and otherwise suitably insulated, and provided with means for allowing their expansion and contraction longitudinally beyond the points where they are held, of service and distributing pipes and means whereby buildings, after being supplied with live steam, can be partly heated by such steam and partly by the water of condensation from this steam, and whereby, also, out-buildings can be heated with such water of condensation, substantially as described.

44. A section of an underground street-main for supplying either heat or power, united to other sections by stationary connections which permit it to expand and contract longitudinally without liability of leakage at the joints of the mains, and also independently of the sections to which it is jointed, substantially as described.

45. Underground heat or power supplying street-mains provided with service-pipes and embedded in the earth within a stationary non-conducting and insulating case, as at $m^2$, or its equivalent, and otherwise suitably insulated, and having their sections united by stationary connections which permit longitudinal expansion and contraction without liability of breakage or leakage and without displacement of the supporting and sustaining portions of the mains, substantially as described.

46. Underground heat and power supplying mains provided with service-pipes and suitably insulated, and their sections having joints which permit longitudinal expansion and contraction, in combination with mechanism for recording or registering the consumption of the agent used for heating purposes or for furnishing power, substantially as described.

47. The combination, with steam-conveying pipes of a building for conveying steam to heat the building and for other purposes, of a meter constructed to control the pressure of the steam in such pipes, and connected with mechanism which records or registers the consumption of steam in the building, substantially as described.

48. An underground steam street-main, in combination with steam-supplying apparatus, and with a heat radiator or radiators of a building and means for recording the consumption of steam in the building, substantially as described.

49. The combination, with underground steam street-mains provided with service-pipes and suitably insulated, of mechanism for recording the consumption of steam from the mains, substantially as described.

50. A contrivance or contrivances for supplying heat for warming districts of buildings in cities and towns, and for furnishing power for driving machinery and for other purposes in such districts, consisting of heat and power supplying apparatus, street steam-mains having expansion-joints, service-pipes having connecting-pipes, and mechanism for registering or recording the consumption of steam, substantially as described.

51. A contrivance or contrivances for supplying heat for warming purposes in districts of buildings in cities and towns, and for furnishing power for driving machinery and for other purposes in said districts, consisting of steam-supplying apparatus, steam street-mains having expansion junction service-boxes, service-pipes, and meters for controlling the pressure of steam from the mains, substantially as described.

52. A contrivance or contrivances for supplying steam for warming districts of buildings in cities and towns, and for driving machinery and other purposes in said districts, consisting of steam-supplying apparatus, street-mains having expansion-joints and inclosed in a stationary non-conducting insulating-case, service-pipes having connecting-pipes, and an automatic regulator, into which a portion of the steam from the mains passes on its way to the points of use, substantially as described.

53. A contrivance or contrivances for supplying heat or power, or both, to districts of dwellings or buildings in cities and towns, comprising underground insulated and drained street-mains, stationary means which permit longitudinal expansion and contraction of the mains without danger of breakage or leakage, a general or central apparatus for producing the heat and power as a source from which the supply is obtained, and service-pipes having connecting-pipes, substantially as described.

54. A contrivance or contrivances for supplying steam for warming districts of buildings in cities and towns, and for driving machinery and for other purposes in said districts, consisting of steam-supplying apparatus, street-mains having expansion-joints, service-pipes having connecting-pipes, and meters, substantially as and for the purposes described.

55. A contrivance or contrivances for supplying steam for warming districts of buildings in cities and towns, and for driving machinery and for other purposes, in said districts, consisting of steam-supplying apparatus, street-mains, service-pipes, connecting-pipes, steam-trap, reheater, steam-hydrant, water-hydrant, means for melting snow and ice, meters, regulators, and means for insulating the mains, and also means for draining the same, substantially as described.

Witnesses: BIRDSILL HOLLY.

I. H. BABCOCK,

B. D. HALL.